United States Patent
Olsen et al.

(10) Patent No.: US 10,251,241 B2
(45) Date of Patent: Apr. 2, 2019

(54) GESTURE-BASED CONTROL TECHNIQUES FOR LIGHTING SYSTEMS

(71) Applicants: Joseph Allen Olsen, Gloucester, MA (US); Jeremy Spaulding, Marblehead, MA (US); Mervyn Anthony, Woburn, MA (US); Alan Sarkisian, Brookline, MA (US)

(72) Inventors: Joseph Allen Olsen, Gloucester, MA (US); Jeremy Spaulding, Marblehead, MA (US); Mervyn Anthony, Woburn, MA (US); Alan Sarkisian, Brookline, MA (US)

(73) Assignee: OSRAM SYLVANIA Inc., Wilmington, MA (US)

( * ) Notice: Subject to any disclaimer, the term of this patent is extended or adjusted under 35 U.S.C. 154(b) by 0 days.

(21) Appl. No.: 14/670,635

(22) Filed: Mar. 27, 2015

(65) Prior Publication Data
US 2016/0286625 A1    Sep. 29, 2016

(51) Int. Cl.
*H05B 37/02*  (2006.01)
*H05B 33/08*  (2006.01)

(52) U.S. Cl.
CPC ..... *H05B 37/0227* (2013.01); *H05B 33/0845* (2013.01); *H05B 33/0854* (2013.01);
(Continued)

(58) Field of Classification Search
CPC ............ H05B 37/0227; H05B 33/0845; H05B 33/0854; H05B 33/0857; H05B 33/0896; H05B 37/0272
See application file for complete search history.

(56) References Cited

U.S. PATENT DOCUMENTS 8,589,824 B2  11/2013  Hillis et al.
8,820,963 B2   9/2014  Olsen et al.
(Continued)

FOREIGN PATENT DOCUMENTS

WO    2013085600 A2   6/2013
WO    2014181205 A2  11/2014

OTHER PUBLICATIONS

Henderon, Richard, Extended Search Report for counterpart application EP16155189.0, dated Jul. 29, 2016, European Patent Office, Dresden, DE, 8 pages.

*Primary Examiner* — Sahlu Okebato
(74) *Attorney, Agent, or Firm* — Yutian Ling

(57) ABSTRACT

Techniques and architecture are disclosed for gesture-based control techniques for lighting systems. In some cases, the lighting system may include a camera and/or other suitable componentry to interpret gestures made by a user for controlling light output. In some such cases, the gesture performed and/or the location of the gesture may determine how the light output is controlled. In some cases, the gestures may be performed by moving a mobile computing device, such as a smartphone, tablet, or dedicated light controller device. In some such cases, sensors included in or otherwise operatively coupled to the computing device (gravitational sensors, accelerometers, gyroscopic sensors, etc.) may be used to detect the movement of the device and the related gestures. The gestures may be used to navigate a user interface that allows a user to control light output by adjusting different attributes of the light output, such as light intensity and color.

16 Claims, 10 Drawing Sheets

(52) U.S. Cl.
CPC ..... *H05B 33/0857* (2013.01); *H05B 33/0896* (2013.01); *H05B 37/0272* (2013.01); *Y02B 20/48* (2013.01)

(56) References Cited

U.S. PATENT DOCUMENTS

| | | | | |
|---|---|---|---|---|
| 2009/0231271 | A1* | 9/2009 | Heubel | G06F 3/016 345/156 |
| 2010/0026719 | A1* | 2/2010 | Ozawa | G06F 3/0483 345/650 |
| 2013/0120238 | A1* | 5/2013 | Spaulding | H05B 37/0227 345/156 |
| 2013/0294067 | A1 | 11/2013 | Engel-Hall et al. | |
| 2013/0300316 | A1* | 11/2013 | Engel-Hall | H05B 37/02 315/307 |
| 2014/0225526 | A1* | 8/2014 | Jonsson | H05B 37/02 315/291 |
| 2016/0174337 | A1* | 6/2016 | Ross | H05B 37/0227 315/294 |

* cited by examiner

GESTURE-BASED CONTROL TECHNIQUES FOR LIGHTING SYSTEMS

FIELD OF THE DISCLOSURE

The disclosure relates to lighting technology, and more particularly to gesture-based techniques for controlling lighting systems.

BACKGROUND

Designing lighting systems involves a number of challenges. For example, developing and implementing techniques for controlling lighting systems, particularly in light of the increase in the complexity of luminaires and lighting systems, involves a number of non-trivial issues, particularly with respect to the variety of lighting parameters that can be controlled.

Figure 1:
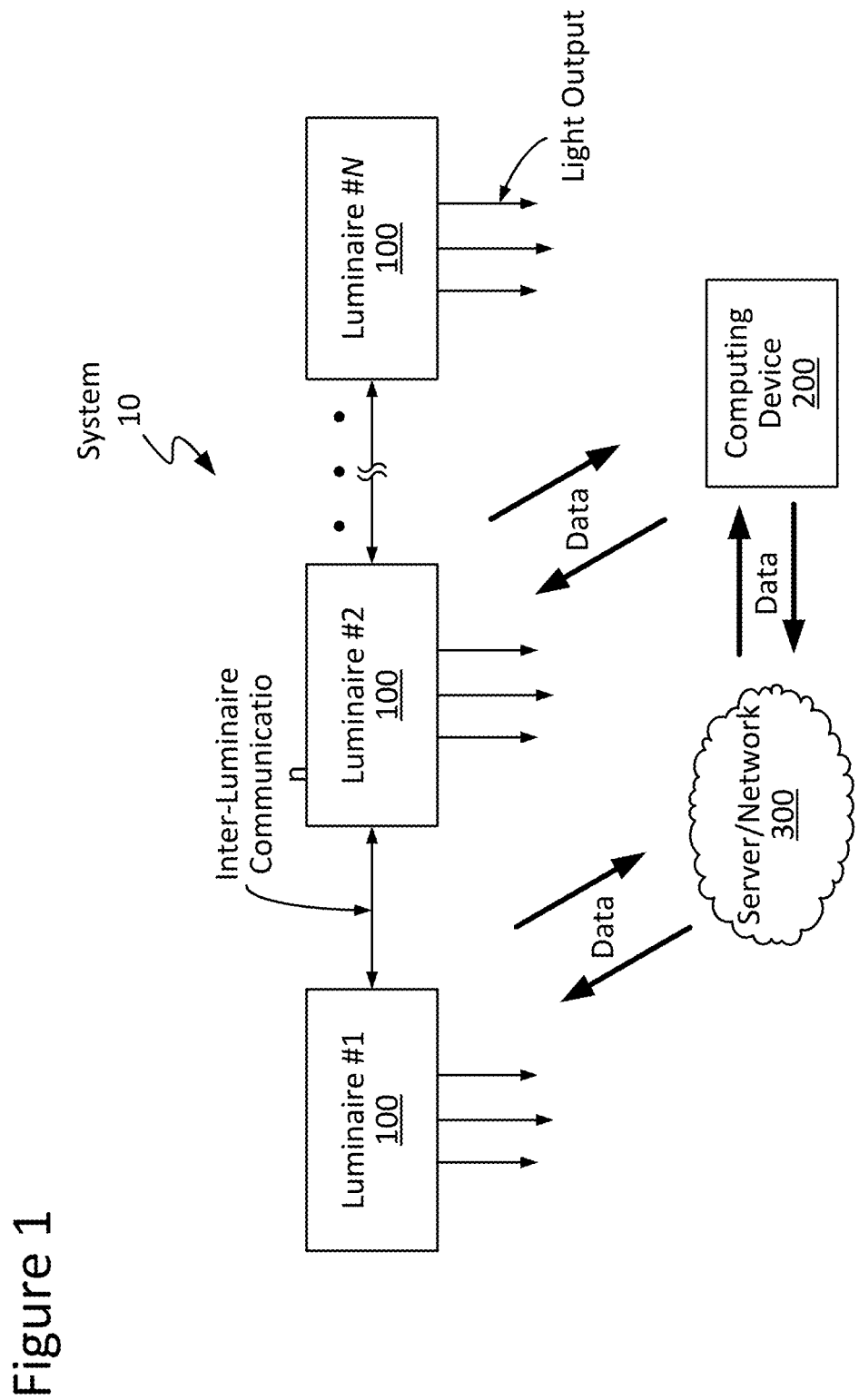
FIG. 1 illustrates an example lighting system, in accordance with an embodiment of the present disclosure.

These and other features of the present embodiments will be understood better by reading the following detailed description, taken together with the figures herein described. In the drawings, each identical or nearly identical component that is illustrated in various figures is represented by a like numeral. For purposes of clarity, not every component may be labeled in every drawing. As will be appreciated, the figures are not necessarily drawn to scale or intended to limit the claimed invention to the specific configurations shown. For instance, while some figures generally indicate straight lines, right angles, and smooth surfaces, an actual implementation of a given embodiment may have less than perfect straight lines, right angles, etc., given real world limitations. In short, the figures are provided merely to show example structures.

DETAILED DESCRIPTION

Techniques and architecture are disclosed for gesture-based control techniques for lighting systems. In some cases, the lighting system may include a camera and/or other suitable componentry to interpret gestures made by a user for controlling light output. In some such cases, the gesture performed and/or the location of the gesture may determine how the light output is controlled. In some cases, the gestures may be performed by moving a mobile computing device, such as a smartphone, tablet, or dedicated light controller device. In some such cases, sensors included in or otherwise coupled to the computing device (e.g., gravitational sensors, accelerometers, gyroscopic sensors, etc.) may be used to detect the movement of the device and the related gestures. The gestures may be used to navigate a user interface that allows a user to control light output by adjusting different attributes of the light output, such as light intensity and light color. Some benefits of the techniques as variously provided herein include a more intuitive or natural experience for controlling lighting systems, receiving real-time feedback from the lighting system being controlled, providing an enjoyable and immersive light control experience to the user, increased customizability of the lighting system and the light output therefrom, and savings in time related to setting up the lighting system as desired. Numerous configurations and variations will be apparent in light of this disclosure.

General Overview

As previously noted, there are a number of non-trivial challenges that can contribute to the difficulty in designing lighting systems, including developing and implementing techniques for controlling lighting systems. The complexity of luminaires and lighting systems has been increasing, particularly with the widespread adoption of solid-state lighting (SSL), leading to an increase in the various attributes of light output that can be controlled. For example, control has increased with respect to luminance, color, aiming and focusing, distribution and spread, and other light attributes such as color temperature and color rendering. This has resulted in the need for developing techniques for controlling these more complex luminaires and lighting systems. One such known technique is to adjust luminaires and associated light output manually, such as by physically adjusting the luminaire by hand at the luminaire itself. However, such an example technique and other known control techniques are typically difficult, time consuming, and unintuitive, leading to a diminished user experience.

Thus, and in accordance with an embodiment of the present disclosure, techniques for gesture-based control of lighting systems are disclosed. Gestures include physical actions that can be performed to indicate a desired command, and they can be performed by the hands, face, or other suitable body parts of a user, for example. In some embodiments, the lighting system (or a computing device and/or a luminaire of the system) may include a user interface configured to allow a user to control light output using gesture-based techniques, which may be referred to herein as a gesture mode. In some embodiments, the lighting system may include, for example, a camera and/or other suitable componentry to interpret gestures made by a user. In some such embodiments, the user may initially invoke the gesture mode using a suitable action to indicate that the user would like to control the lighting system using gestures, thereby preventing undesired gesture-based commands from occurring when the user is not intending to issue such commands. After the gesture mode has been invoked, the user can perform gestures to control the lighting system, such as pointing to an object to direct the focus of the light to the object, spreading a hand across a surface to spread the light over that surface, or provide a thumbs up or thumbs down to respectively indicate increased or decreased light intensity where the user is standing, just to name a few example gesture commands. As will be apparent in light of this disclosure, the techniques may include various suitable gestures and each unique gesture may be assigned a suitable command, such that the techniques can be customized as desired for a given target application or end-use.

In some embodiments, gesture-based techniques for controlling light output may be provided via a mobile computing device, such as a smartphone, tablet computing device, or dedicated light controller device, for example. In some such embodiments, the gestures may be performed using a touch-sensitive surface operatively coupled to the device, such as a touch-sensitive display, for example. In other such embodiments, sensors of the device may be used to detect the motion of the computing device, such that the gestures can be made by moving the device. Example sensor types that can be used for detecting the motion of the computing device include gravitational sensors configured to measure gravitational forces acting upon the computing device, accelerometers configured to measure acceleration of the computing device, and gyroscopic sensors configured to measure rotation of the computing device, just to name a few example sensors. In some such embodiments, calculations or revisions may be made to the data received from the sensors of the computing device to ensure that the gesture-based light control techniques based on movement of the computing device are robust enough to provide accurate results.

In some embodiments, the gesture mode may allow a user to adjust one or more attributes of light output from one or more light sources (e.g., solid-state light sources) of one or more luminaires. In some such cases, the gesture mode may include one or more light control modes configured to control a unique attribute of the light output, such as the light intensity (e.g., luminance or dimming percentage), color, color temperature, color rendering, preset configuration (e.g., using user presets and/or default presets), spread (e.g., the distribution of the light), focus (e.g., where within a room or area the light is aimed), whether one or more light sources are on or off, or any other suitable attribute as will be apparent in light of the present disclosure. In some cases, the gesture mode may include various categories of types of gestures used for navigating the gesture mode. For example, the gesture mode may include selection gestures having a continuous space or range for adjusting the attribute of a light control mode, trigger gestures for transitioning or shifting between the which light control mode is active and being controlled, and confirmation gestures for applying (or reverting) the adjustment to the light control mode, as will be discussed in more detail herein. The gesture mode may be executed using one or more processors and/or controllers located in a computing device, a luminaire, or a combination of both. Therefore, the intelligence for the gesture mode may be provided by the computing device, the luminaire, or both, or in some cases, via a server or network (e.g., via the cloud).

Specific gestures within each gesture type described above will be discussed in more detail herein. An example selection gesture is a pitch gesture performed by angularly lifting and lowering the computing device (e.g., by bending at the wrist or elbow) to provide a continuous range of pitch angles that can be used to control light output. The pitch gesture may include a natural and intuitive lifting and lowering motion of the hand as a tunable method of selection. An example trigger gesture is a fling gesture performed by moving the computing device by translation in a direction, where the fling direction can be used to switch between light control modes. The fling gesture may include a quick motion by the user's hand along a particular axis of the computing device that is measurable with respect to that axis, which is a natural and intuitive gesture for switching between items. An example selection gesture is a tilt gesture performed by rotating the device in a direction about a main axis of the computing device, where the tilt direction can be used to cause at least one of applying a selected option or reverting to a previously selected option (or the default option). The tilt gesture may include a triggering confirmation based off of the natural and intuitive movement emulating the locking or unlocking of a key lock. Numerous other suitable gestures will be apparent in light of this disclosure.

Some benefits of the techniques as variously provided herein include a more intuitive or natural experience for controlling lighting systems, receiving real-time feedback from the lighting system being controlled, providing an enjoyable and immersive light control experience to the user, increased customizability of the lighting system and the light output therefrom, savings in time related to setting up the lighting system as desired, and numerous other benefits as will be apparent in light of the present disclosure. In some embodiments, the gesture-based light control techniques are natural to a user such that the gestures used to control the lighting system are intuitive. In some embodiments, the gesture-based light control techniques provide an immersive experience to the user while controlling the light output, such that the user receives real-time feedback from the lights being controlled. Further, in some such embodiments, the user can look at the light output as it is being changed, because the gesture-based light control techniques do not necessitate a user to look at the controls for changing the lights, but instead use gestures that free up the user's vision.

Furthermore, and in accordance with some embodiments, a lighting system designed using the disclosed techniques/architecture can be provided, for example, as: (1) a partially/completely assembled lighting system; and/or (2) a kit or other collection of separate components (e.g., luminaires, display devices, controller, processor, etc.) which may be operatively coupled to form a lighting system as variously described herein. In some embodiments, the lighting system is highly configurable and scalable, and it can be programmed or otherwise configured to be controlled using gesture-based techniques as variously described herein. In some embodiments, corrections or revisions may be made when detecting or determining gestures to ensure that the gesture-based light control techniques variously described herein are robust enough to provide accurate results. In some embodiments, voice-based control techniques for lighting systems may be used to augment or substitute the gesture-based controls variously described herein. In some such embodiments, the lighting system (e.g., a computing device or luminaire of the system) may include a microphone and other suitable componentry and software to interpret the voice commands. Numerous variations and configurations will be apparent in light of the present disclosure.

System Architecture and Operation

FIG. 1 illustrates an example lighting system 10, in accordance with an embodiment of the present disclosure. As can be seen, lighting system 10 includes multiple luminaires 100 and computing device 200. Luminaires 100 and computing device 200 may be configured to be communicatively coupled using, for example, server/network 300 (discussed in more detail below). Although lighting system 10 is shown in FIG. 1 as having any number N of luminaires 100, system 10 may include only luminaire 100 or multiple luminaires 100, each of which are configured to output light. Luminaires 100 are shown having inter-luminaire communication capabilities in example lighting system 10, which may be provided via any suitable wired and/or wireless techniques to, for example, allow a luminaire 100 to transmit and/or receive data from one or more other luminaires 100, such as data related to the gesture-based control techniques as variously described herein. In some embodiments, luminaires 100 may be communicatively coupled using, for example, server/network 15. However, luminaires 100 need not have such inter-luminaire communication capabilities. Luminaires 100 will be discussed in more detail herein, such as with reference to FIG. 2. Computing device 200 will be discussed in more detail herein, such as with reference to FIGS. 3A-B. Note that in some embodiments, computing device 200 is not needed to perform the gesture-based control techniques as variously described herein.

Figure 2:
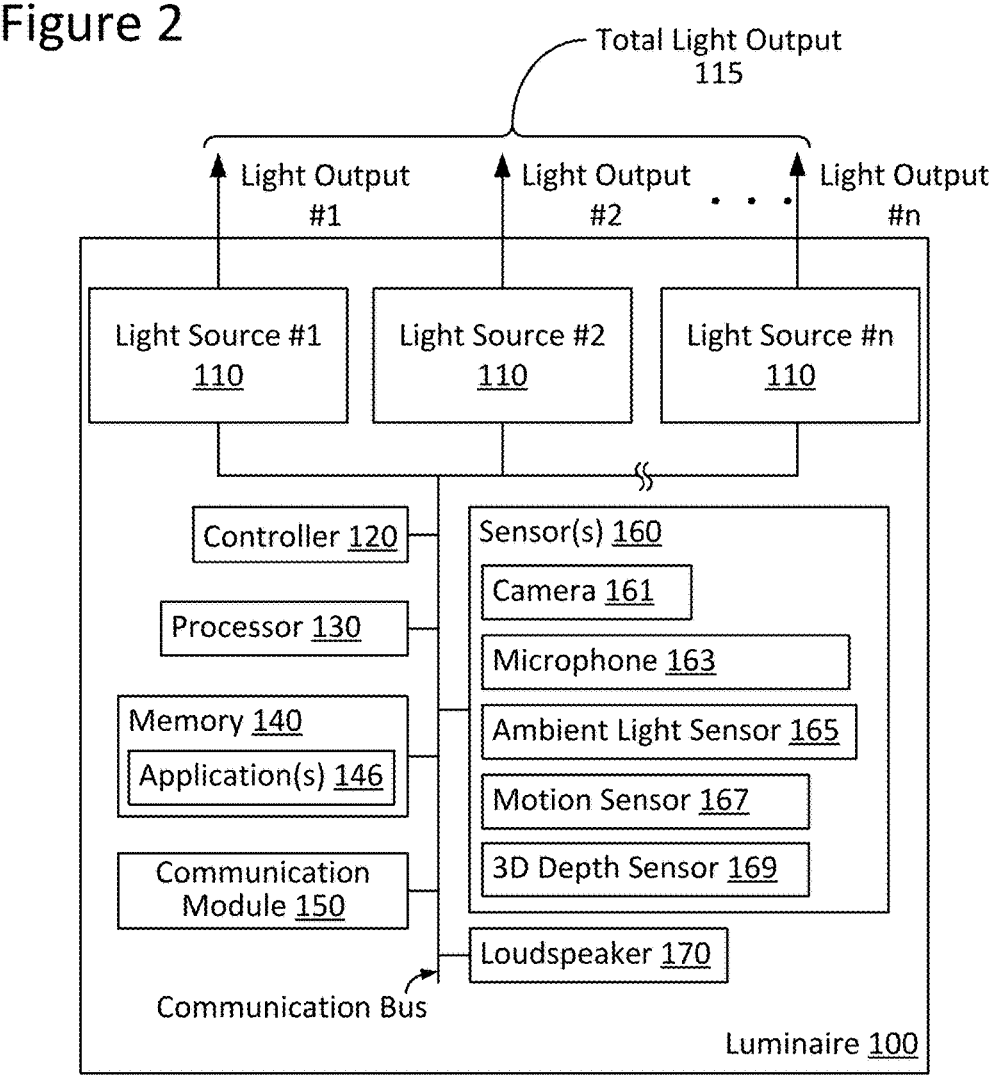
FIG. 2 is a block diagram illustrating an example luminaire configured in accordance with an embodiment of the present disclosure.

FIG. 2 is a block diagram illustrating an example luminaire 100 configured in accordance with an embodiment of the present disclosure. As can be seen, luminaire 100 may include one or more light sources 110 that each provide corresponding light output. The number n of light sources 110 for a given luminaire 100 can be customized as desired for a given target application or end-use. The light sources 110 and componentry of luminaire 100 will be described in more detail herein. However, note that luminaire 100 may include additional or alternative componentry based on the specific configuration used. For example, in the case of luminaire 100 including solid-state light sources 110, luminaire 100 may include componentry such as at least one driver, modulator, digital to analog (DAC) converter (not shown), just to name some additional example componentry. Also note that although the componentry (e.g., controller 120, processor 130, etc.) is shown as being within the box representing luminaire 100, such componentry need not be physically located within the housing of luminaire 100. In some embodiments, some or all (or alternative) componentry shown in FIG. 2 may generally be a part of lighting system 300 and may be used to control multiple luminaires 100 (e.g., control multiple luminaires 100 simultaneously).

As previously described, in some embodiments, luminaire 100 may include one or more solid-state light sources 110. A given solid-state light source may include one or more solid-state emitters, which may be any of a wide range of semiconductor light source devices, such as, for example: (1) a light-emitting diode (LED); (2) an organic light-emitting diode (OLED); (3) a polymer light-emitting diode (PLED); and/or (4) a combination of any one or more thereof. In some embodiments, a given solid-state emitter may be configured for emissions of a single correlated color temperature (CCT) (e.g., a white light-emitting semiconductor light source). In some other embodiments, however, a given solid-state emitter may be configured for color-tunable emissions. For instance, in some cases, a given solid-state emitter may be a multi-color (e.g., bi-color, tri-color, etc.) semiconductor light source configured for a combination of emissions, such as: (1) red-green-blue (RGB); (2) red-green-blue-yellow (RGBY); (3) red-green-blue-white (RGBW); (4) dual-white; and/or (5) a combination of any one or more thereof. In some embodiments, luminaire 100 may include other light sources 110 in addition to or in the alternative of solid-state light sources 110, such as incandescent or fluorescent lighting, for example. The quantity and arrangement of lighting sources 110 utilized for each luminaire may be customized as desired for a given target application or end-use.

As can be seen in FIG. 2, Luminaire 100 may include at least one controller 120, at least one processor 130, and/or memory 140. Controller(s) 120 may be configured to be operatively coupled (e.g., via a communication bus or other suitable interconnect) with light sources 110 or corresponding componentry, such as the light source drivers (not shown), to control the light output provided therefrom. Note that the light output from each light source 110 creates a total light output 115, in this example embodiment. In some embodiments, luminaire 100 may include a centralized controller 120 and/or processor 130 configured to control the total light output 115 of the entire system. In some such embodiments, the control of the light output may be wired and/or wireless, depending upon the given configuration. In some embodiments, light sources 110 of luminaire may be individually controlled. In any case, luminaire 100 and the total light output 115 therefrom can be controlled using the gesture-based techniques variously described herein.

Memory 140 can be of any suitable type (e.g., RAM and/or ROM, or other suitable memory) and size, and in some cases may be implemented with volatile memory, non-volatile memory, or a combination thereof. A given processor 130 may be configured as typically done, and in some embodiments may be configured, for example, to perform operations associated with luminaire 10 or a given light source 110 and one or more of the modules thereof (e.g., within memory 140 or elsewhere). In some cases, memory 140 may be configured to be utilized, for example, for processor workspace (e.g., for one or more processors 130) and/or to store media, programs, applications 146, and/or content for luminaire 100 or system 10 on a temporary or permanent basis.

The one or more modules stored in memory 140 can be accessed and executed, for example, by the one or more processors 130 of luminaire 100. In accordance with some embodiments, a given module of memory 140 can be implemented in any suitable standard and/or custom/proprietary programming language, such as, for example: (1) C; (2) C++; (3) objective C; (4) JavaScript; and/or (5) any other suitable custom or proprietary instruction sets, as will be apparent in light of this disclosure. The modules of memory 140 can be encoded, for example, on a machine-readable medium that, when executed by a processor 130, carries out the functionality of luminaire 100 or system 10, in part or in whole. The computer-readable medium may be, for example, a hard drive, a compact disk, a memory stick, a server, or any suitable non-transitory computer/computing device memory that includes executable instructions, or a plurality or combination of such memories. Other embodiments can be implemented, for instance, with gate-level logic or an application-specific integrated circuit (ASIC) or chip set or other such purpose-built logic. Some embodiments can be implemented with a microcontroller having input/output capability (e.g., inputs for receiving user inputs; outputs for directing other components) and a number of embedded routines for carrying out the device functionality. In a more general sense, the functional modules of memory 140 (e.g., one or more applications 142, discussed below)

can be implemented in hardware, software, and/or firmware, as desired for a given target application or end-use.

In accordance with some embodiments, memory 140 may have stored therein (or otherwise have access to) one or more applications 142. In some instances, a given luminaire 100 may be configured to receive input, for example, via one or more applications 142 stored in memory 140. For instance, an example application 142 may allow a user to program or configure luminaire 100, such as the light output, menus, or modes prompted in response to various gesture-based control techniques. Other suitable modules, applications, and data which may be stored in memory 140 (or may be otherwise accessible to luminaire 100) will depend on a given application and will be apparent in light of this disclosure.

In accordance with some embodiments, a given luminaire 100 may include a communication module 150, which may be configured for wired (e.g., Universal Serial Bus or USB, Ethernet, FireWire, etc.) and/or wireless (e.g., Wi-Fi, Bluetooth, etc.) communication, as desired. In accordance with some embodiments, communication module 150 may be configured to communicate locally and/or remotely utilizing any of a wide range of wired and/or wireless communications protocols, including, for example: (1) a digital multiplexer (DMX) interface protocol; (2) a Wi-Fi protocol; (3) a Bluetooth protocol; (4) a digital addressable lighting interface (DALI) protocol; (5) a ZigBee protocol; and/or (6) a combination of any one or more thereof. It should be noted, however, that the present disclosure is not so limited to only these example communications protocols, as in a more general sense, and in accordance with some embodiments, any suitable communications protocol, wired and/or wireless, standard and/or custom/proprietary, may be utilized by communication module 150, as desired for a given target application or end-use. In some instances, communication module 150 may be configured to facilitate inter-system communication between luminaires 100 and/or communication between luminaire(s) 100 and computing device 200. Other suitable configurations for communication module 150 will depend on a given application and will be apparent in light of this disclosure.

In accordance with some embodiments, a given luminaire 100 may include one or more optional sensors 160. In some embodiments, a given luminaire 100 may optionally include at least one camera 161 (or image capture device), microphone 163 (or sound capture device), ambient light sensor 165, motion sensor 167, 3-dimensional (3D) depth sensor 169, and/or any other suitable sensor to, for example, implement the techniques variously described herein. When included, sensor(s) 160 may be configured as typically done. For example, camera 161 and 3D depth sensor 169 may be configured to detect gestures using techniques used by, for example, the Kinect® by Microsoft®. Such gestures may be used to control luminaire 100, as will be described in more detail herein. In another example, microphone 163 may be configured to detect voice commands used to control luminaire 100. In any case, the sensor(s) 160 of a given luminaire 100 may include componentry as desired for a given target application or end-use. Also, it should be noted that the present disclosure is not so limited only to the example optional sensors 160 shown, as additional and/or different sensors 160 may be provided, as desired for a given target application or end-use, in accordance with some other embodiments.

In accordance with some embodiments, a given luminaire 100 may include one or more loudspeakers 170 or other audio output devices. Loudspeaker(s) 170 can be, for example, a speaker or any other device capable of producing sound from an audio data signal, in accordance with some embodiments. Loudspeaker(s) 170 may be programmed using any suitable techniques and they may be configured to output audio related to the gesture-based control techniques variously described herein. For example, controller 120 and/or processor 130 may be configured to control audio output of the loudspeaker(s) 170 to provide audio feedback as to whether an attempted gesture has been recognized or provide audio feedback relating to the specific gesture detected or the resulting change in light output (e.g., dimming lights by 10%, changing light color to red, moving light focus to location indicated, etc.). When included, loudspeaker(s) 170 may be configured as typically done and may include componentry as desired for a given target application or end-use. Numerous configurations and variations on luminaire(s) 100 will be apparent in light of this disclosure.

Figure 3A:
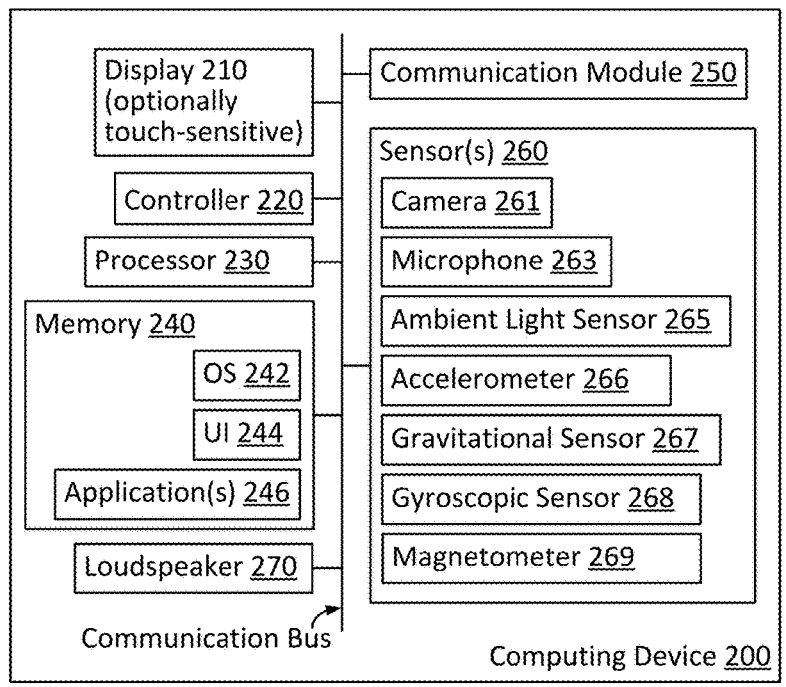
FIG. 3A illustrates an example computing device configured in accordance with an embodiment of the present disclosure.

FIG. 3A illustrates an example computing device 200 configured in accordance with an embodiment of the present disclosure. Computing device 200 can be any of a wide range of computing platforms, mobile or otherwise. For example, in accordance with some embodiments, computing device 200 can be, in part or in whole: (1) a laptop/notebook computer or sub-notebook computer; (2) a tablet or phablet computer; (3) a mobile phone or smartphone; (4) a personal digital assistant (PDA); (5) a portable media player (PMP); (6) a cellular handset; (7) a handheld gaming device; (8) a gaming platform; (9) a desktop computer; (10) a television set; (11) a wearable or otherwise body-borne computing device, such as a smartwatch, smart glasses, or smart headgear; and/or (12) a combination of any one or more thereof. Other suitable configurations for computing device 200 will depend on a given application and will be apparent in light of this disclosure.

In accordance with some embodiments, computing device 200 may include a display 210. Display 210 can be any electronic visual display or other device configured to display or otherwise generate an image (e.g., image, video, text, and/or other displayable content) therefrom. In some instances, display 210 may be integrated, in part or in whole, with computing device 200, whereas in some other instances, display 210 may be a stand-alone component configured to communicate with computing device 200 using any suitable wired and/or wireless communications means.

In some cases, display 210 optionally may be a touchscreen display or other touch-sensitive display. To that end, display 210 may utilize any of a wide range of touch-sensing techniques, such as, for example: (1) resistive touch-sensing; (2) capacitive touch-sensing; (3) surface acoustic wave (SAW) touch-sensing; (4) infrared (IR) touch-sensing; (5) optical imaging touch-sensing; and/or (6) a combination of any one or more thereof. In a more general sense, and in accordance with some embodiments, an optionally touch-sensitive display 210 generally may be configured to detect or otherwise sense direct and/or proximate contact from a user's finger, stylus, or other suitable implement at a given location of that display 210. In some cases, an optionally touch-sensitive display 210 may be configured to translate such contact into an electronic signal that can be processed by computing device 200 (e.g., by the one or more processors 230 thereof) and manipulated or otherwise used to trigger a given GUI action. In some cases, a touch-sensitive display 210 may facilitate user interaction with computing device 200 via the GUI presented by such display 210.

Numerous suitable configurations for display 210 will be apparent in light of this disclosure.

In accordance with some embodiments, computing device 200 may include or otherwise be communicatively coupled with one or more controllers 220. A given controller 220 may be configured to output one or more control signals to control any one or more of the various components/modules of computing device 200 and may do so, for example, based on wired and/or wireless input received from a given local source (e.g., such as on-board memory 240) and/or remote source (e.g., such as a control interface, optional server/network 15, etc.). In accordance with some embodiments, a given controller 220 may host one or more control modules and can be programmed or otherwise configured to output one or more control signals, for example, to adjust the operation of a given portion of computing device 200. For example, in some cases, a given controller 220 may be configured to output a control signal to control operation of a given camera 261 or image capture device of computing device 200 (e.g., a front-facing image capture device or a rear-facing image capture device). In some instances, a given controller 220 may be configured to output a control signal to control operation of one or more sensors 260 (discussed in more detail herein). Other suitable configurations and control signal output for a given controller 220 of computing device 200 will depend on a given application and will be apparent in light of this disclosure.

In accordance with some embodiments, computing device 200 may include memory 240 and one or more processors 230. Memory 240 can be of any suitable type (e.g., RAM and/or ROM, or other suitable memory) and size, and in some cases may be implemented with volatile memory, non-volatile memory, or a combination thereof. A given processor 230 of computing device 200 may be configured as typically done, and in some embodiments may be configured, for example, to perform operations associated with computing device 200 and one or more of the modules thereof (e.g., within memory 240 or elsewhere). In some cases, memory 240 may be configured to be utilized, for example, for processor workspace (e.g., for one or more processors 230) and/or to store media, programs, applications, and/or content on computing device 200 on a temporary or permanent basis.

The one or more modules stored in memory 240 can be accessed and executed, for example, by the one or more processors 230 of computing device 200. In accordance with some embodiments, a given module of memory 240 can be implemented in any suitable standard and/or custom/proprietary programming language, such as, for example: (1) C; (2) C++; (3) objective C; (4) JavaScript; and/or (5) any other suitable custom or proprietary instruction sets, as will be apparent in light of this disclosure. The modules of memory 240 can be encoded, for example, on a machine-readable medium that, when executed by one or more processors 230, carries out the functionality of computing device 200, in part or in whole. The computer-readable medium may be, for example, a hard drive, a compact disk, a memory stick, a server, or any suitable non-transitory computer/computing device memory that includes executable instructions, or a plurality or combination of such memories. Other embodiments can be implemented, for instance, with gate-level logic or an application-specific integrated circuit (ASIC) or chip set or other such purpose-built logic. Some embodiments can be implemented with a microcontroller having input/output capability (e.g., inputs for receiving user inputs; outputs for directing other components) and a number of embedded routines for carrying out the device functionality.

In a more general sense, the functional modules of memory 240 (e.g., such as OS 242, UI 244, and/or one or more applications 246, each discussed below) can be implemented in hardware, software, and/or firmware, as desired for a given target application or end-use.

In accordance with some embodiments, memory 240 may include an operating system (OS) 242. OS 242 can be implemented with any suitable OS, mobile or otherwise, such as, for example: (1) Android OS from Google, Inc.; (2) iOS from Apple, Inc.; (3) BlackBerry OS from BlackBerry Ltd.; (4) Windows Phone OS from Microsoft Corp; (5) Palm OS/Garnet OS from Palm, Inc.; (6) an open source OS, such as Symbian OS; and/or (7) a combination of any one or more thereof. As will be appreciated in light of this disclosure, OS 242 may be configured, for example, to aid with the gesture-based control techniques variously described herein. Other suitable configurations and capabilities for OS 242 will depend on a given application and will be apparent in light of this disclosure.

Figure 3B:
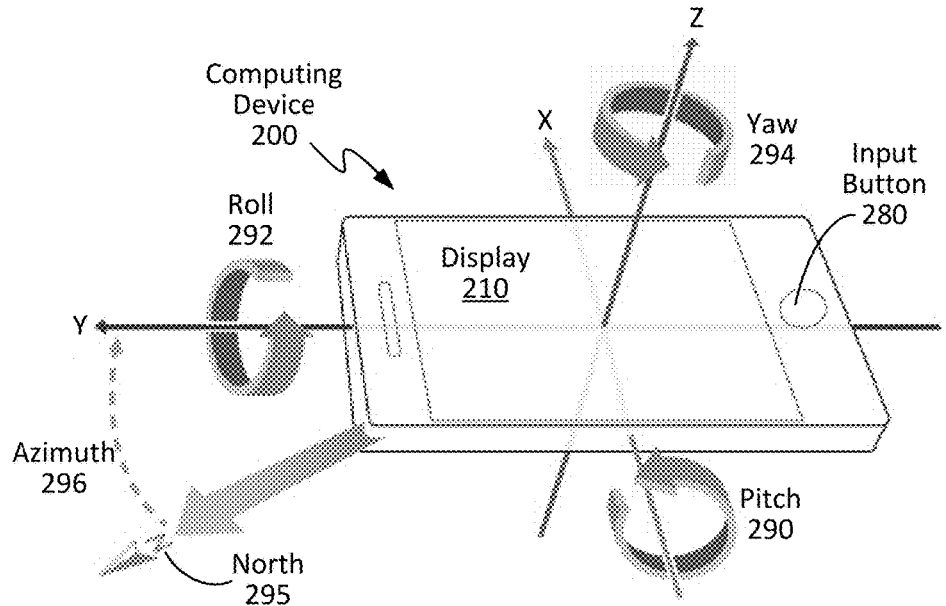
FIG. 3B illustrates an example computing device showing referential axes, in accordance with an embodiment of the present disclosure.

In accordance with some embodiments, computing device 200 may include a user interface (UI) module 244. In some cases, UI 244 can be implemented in memory 240 (e.g., as generally shown in FIG. 3B), whereas in some other cases, UI 244 can be implemented in a combination of locations (e.g., at memory 240 and at display 210, discussed below), thereby providing UI 244 with a given degree of functional distributedness. UI 244 may be configured, in accordance with some embodiments, to present a graphical UI (GUI) at display 210 that is configured, for example, to aid with the gesture-based control techniques variously described herein. Other suitable configurations and capabilities for UI 244 will depend on a given application and will be apparent in light of this disclosure.

In accordance with some embodiments, memory 240 may have stored therein (or otherwise have access to) one or more applications 246. In some instances, computing device 200 may be configured to receive input, for example, via one or more applications 246 stored in memory 240 (such as a gesture-based lighting system control application, for example). Other suitable modules, applications, and data which may be stored in memory 240 (or may be otherwise accessible to computing device 200) will depend on a given application and will be apparent in light of this disclosure.

In accordance with some embodiments, computing device 200 may include a communication module 250, which may be configured for wired (e.g., Universal Serial Bus or USB, Ethernet, FireWire, etc.) and/or wireless (e.g., Wi-Fi, Bluetooth, etc.) communication using any suitable wired and/or wireless transmission technologies (e.g., radio frequency, or RF, transmission; infrared, or IR, light modulation; etc.), as desired. In accordance with some embodiments, communication module 250 may be configured to communicate locally and/or remotely utilizing any of a wide range of wired and/or wireless communications protocols, including, for example: (1) a digital multiplexer (DMX) interface protocol; (2) a Wi-Fi protocol; (3) a Bluetooth protocol; (4) a digital addressable lighting interface (DALI) protocol; (5) a ZigBee protocol; (6) a near field communication (NFC) protocol; (7) a local area network (LAN)-based communication protocol; (8) a cellular-based communication protocol; (9) an Internet-based communication protocol; (10) a satellite-based communication protocol; and/or (11) a combination of any one or more thereof. It should be noted, however, that the present disclosure is not so limited to only these example communications protocols, as in a more general sense, and in accordance with some embodiments, any suitable communications protocol, wired and/or wireless, standard and/or custom/proprietary, may be utilized by communication module 250, as desired for a given target application or end-use. In some instances, communication module 250 may be configured to communicate with one or more luminaires 100. In some cases, communication module 250 of computing device 200 and communication module 150 of a given luminaire 100 may be configured to utilize the same communication protocol. In some cases, communication module 250 may be configured to communicate with a server/network 300 (discussed below). Other suitable configurations for communication module 250 will depend on a given application and will be apparent in light of this disclosure.

In accordance with some embodiments, computing device 200 may include one or more sensors 260. In some embodiments, a given computing device 200 for may optionally include at least one camera 261 (or image capture device), microphone 263 (or sound capture device), ambient light sensor 265, accelerometer 266, gravitational sensor 267, gyroscopic sensor 268, magnetometer 269 (or geomagnetic sensor), and/or any other suitable sensor to, for example, implement the techniques variously described herein. When included, sensor(s) 260 may be configured as typically done. For example, the at least one accelerometer 266, gravitational sensor 267, gyroscopic sensor 268, and/or magnetometer 269 may be used to detect movement of computing device 200 to interpret gestures used in controlling system 10, as will be apparent in light of this disclosure. In any case, the sensor(s) 260 of a given computing device 200 may include componentry as desired for a given target application or end-use. Also, it should be noted that the present disclosure is not so limited only to the example optional sensors 260 shown, as additional and/or different sensors 260 may be provided, as desired for a given target application or end-use, in accordance with some other embodiments.

In accordance with some embodiments, computing device 200 may include one or more loudspeakers 270 or other audio output devices, in accordance with some embodiments. Loudspeaker(s) 270 can be, for example, a speaker or any other device capable of producing sound from an audio data signal, in accordance with some embodiments. Audio output device 270 can be configured, for example, to reproduce sounds local to and/or received by its host computing device 200. In some instances, audio output device 270 may be integrated, in part or in whole, with computing device 200, whereas in some other instances, audio output device 270 may be a stand-alone component configured to communicate with computing device 200 using any suitable wired and/or wireless communications means, as desired. Other suitable types and configurations for audio output device 270 will depend on a given application and will be apparent in light of this disclosure. Numerous configurations and variations on computing device 200 will be apparent in light of this disclosure.

FIG. 3B illustrates an example computing device 200 showing referential axes, configured in accordance with an embodiment of the present disclosure. For ease of description, the computing device in this example embodiment includes all of the modules shown in FIG. 3A and discussed herein. As can be seen, computing device 200 in this example embodiment is a smartphone and includes referential axes X, Y, and Z as shown that will be used to described gestures made using computing device 200 (described in more detail herein). As can also be seen, the device 200 includes input button 280 that may be used to provide various input to computing device 200. Also note that input can be provided via display 210, in this example embodiment, because the display is touch-sensitive (e.g., input provided via a finger or stylus). Further note that, in some embodiments, computing device 200 may include additional or alternative input devices, such as other input buttons (whether physical or capacitive), trackpads, trackballs, or any other suitable input device, as will be apparent in light of this disclosure.

As previously described, computing device 200 may include a number of sensors 260. In the context of the gesture-based controls variously described herein, in some embodiments, the following sensors may be used in the gesture determination: accelerometer(s) 266, gravitational sensor(s) 267, gyroscopic sensor(s) 268, and magnetometer(s) or geomagnetic sensor(s) 269. When describing such sensors and the values produced therefrom, establishment of an inertial frame of reference can be helpful. In this example embodiment, the X, Y, and Z axes shown in FIG. 3B, which define a three-dimensional Cartesian coordinate system, may be used to provide such an inertial frame of reference. As can be seen in this example case, the origin of the coordinate system is the center of device 200. Further, the X-axis follows the horizontal shape of device 200, with the positive X-axis extending through (or pointing toward) the right side of the device and the negative X-axis extending through the left of the device. In addition, the Y-axis follows the vertical shape of device 200 with the positive Y-axis extending through the top side of the device and the negative Y-axis extending through the bottom side of the device (e.g., the side closest to input button 280). Moreover, the Z-axis is normal to display 210 of device 200 (also normal to the X-Y plane) with the positive Z-axis extending through the front of the device and the negative Z-axis extending through the back of the device.

Accelerometer(s) 266, in this example embodiment, may be configured as typically done, and in some example embodiments, may be configured to detect motion and/or measure acceleration of the host computing device 200. For instance, a linear accelerometer may be included for measuring moving forces applied to device 200. Such measurements may be denoted as a vector $\vec{L}$ along each of the axes (X, Y, Z) of device 200, such that $\vec{L}=\langle L_x, L_y, L_z \rangle$. For example, each component of $\vec{L}$ may be unconstrained and measured in m/s², and the linear accelerometer may be useful for tracking motion with respect to the device. However, the linear accelerometer may not be able to provide information about how computing device 200 relates to the world frame. For example, if the device 200 is lying flat on one of its sides on a horizontal surface, $\vec{L}$ will have the same values $\langle 0, 0, 0 \rangle$ regardless of which side of the device is on the horizontal surface.

Gravitational sensor(s) 267, in this example embodiment, may be configured as typically done, and in some example embodiments, may be configured to measure the opposing force of gravity upon host computing device 200. In some embodiments, a gravitational sensor may be derived from the measurements of one or more accelerometers, magnetometers, and gyroscopic sensors. For example, the opposing force of gravity (approximately 9.81 m/s²) may be described as a vector projected onto the axes of the device, creating a gravitational vector, such as $\vec{G}=\langle G_x, G_y, G_z \rangle$. In such an example, the range for each component can be set at (−9.81, 9.81) such that: $\sqrt{G_x^2+G_y^2+G_z^2}=9.81$. Note that the gravitational sensor(s) may be unaffected by any kind of movement applied to the device. However, the gravitational sensor(s) may be used in determining the orientation of the device as it relates to the world frame. For example, if computing device 200 is lying flat on a horizontal surface, then the acting force of gravity may be directly upon the Z-axis. Thus, the value for $\vec{G}$ in such an example case is $\vec{G}=\langle 0, 0, 9.81\rangle$ or $\langle 0, 0, -9.81\rangle$, depending upon which side of the device 200 is on the horizontal surface.

Gyroscopic sensor(s) 268, in this example embodiment, may be configured as typically done, and in some example embodiments, gyroscopic sensor(s) 269 may be configured to determine the orientation and/or rate of rotation of the host computing device 200. Orientation of the device 200 may be expressed using, for example, pitch 290 (rotation about the X-axis), roll 292 (rotation about the Y-axis), and yaw 294 (rotation about the Z-axis). In some cases, the gyroscopic sensor may measure the rate of rotation of the device 200 as a vector, such as $\vec{R}=\langle R_x, R_y, R_z\rangle$, where each component is the rate of rotation around an inertial axis of the device, in terms of radians per second (rad/s). In such an example case, each component of $\vec{R}$ may be unconstrained, and if the device is at ideal rest, $\vec{R}$ would be equal to $\langle 0, 0, 0\rangle$.

Magnetometer(s) or geomagnetic sensor(s) 269, in this example embodiment, may be configured as typically done, and in some example embodiments, may be configured to determine the orientation and/or movement of a host computing device 200 relative to a geomagnetic pole (e.g., geomagnetic north) or other desired heading, which may be customized as desired for a given target application or end-use. As can be seen in FIG. 3B, geomagnetic north 295 is indicated relative to device 200, allowing for an azimuth 296 (an angular measurement in a spherical coordinate system) to be determined. In this example embodiment, azimuth 296 is calculated from the Y-axis as shown and such an azimuth 296; however, any suitable reference may be used for calculating an azimuth for computing device 200 (e.g., north or south as measured from the X, Y, or Z-axis).

Referring back to FIG. 1, server/network 300 may be any suitable public and/or private communications network. For instance, in some cases, server/network 300 may be a private local area network (LAN) operatively coupled to a wide area network (WAN), such as the Internet. In some cases, server/network 300 may include one or more second-generation (2G), third-generation (3G), and/or fourth-generation (4G) mobile communication technologies. In some cases, server/network 300 may include a wireless local area network (WLAN) (e.g., Wi-Fi wireless data communication technologies). In some instances, server/network 300 may include Bluetooth wireless data communication technologies. In some cases, server/network 300 may include supporting infrastructure and/or functionalities, such as a server and a service provider, but such features are not necessary to carry out communication via server/network 15. In some instances, computing device 200 may be configured for communicative coupling, for example, with a server/network 300 and one or more luminaires 100. In some such instances, communication modules 150, 250 of luminaire(s) 100 and computing device 200, respectively, may be utilized in the communicative coupling. In some instances, computing device 200 may be configured to transmit data to luminaire(s) 100 via server/network 300 that facilitates the gesture-based control techniques variously described herein. Numerous configurations for server/network 300 will be apparent in light of this disclosure. In some embodiments, the calculations, processing, or other system 10 intelligence used to perform the gesture-based control techniques described herein may be executed by computing device 200, server/network 300 (e.g., within the cloud), and/or luminaire(s) 100. Numerous configurations and variations will be apparent in light of this disclosure.

Example Gesture-Based Controls

Figure 4A:
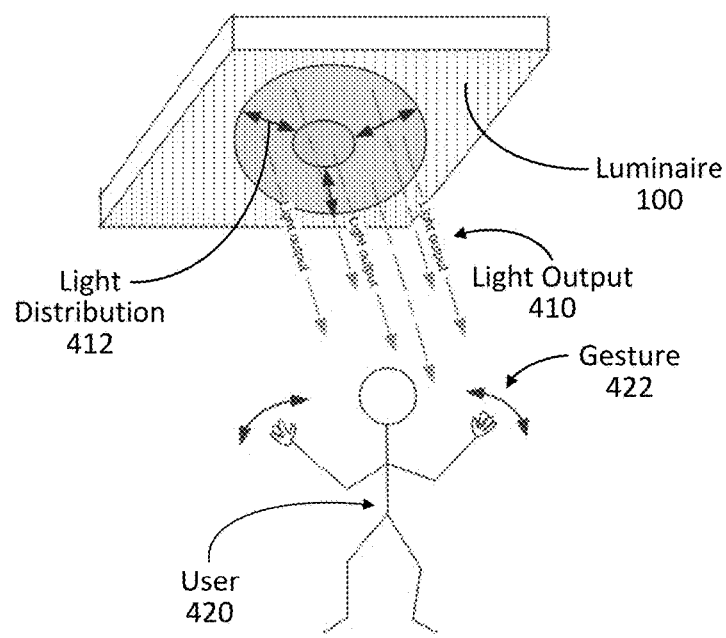
FIGS. 4A-B illustrate an example lighting system capable of being controlled using gestures, in accordance with an embodiment of the present disclosure.
Figure 4B:
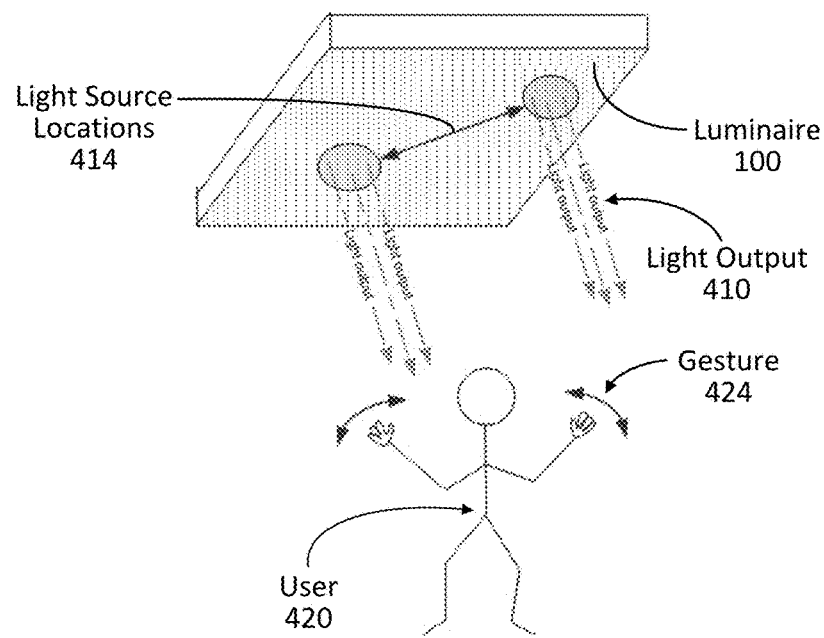

FIGS. 4A-B illustrate an example lighting system capable of being controlled using gestures, in accordance with an embodiment of the present disclosure. As can be seen, the lighting system in this example embodiment includes luminaire 100 capable of producing light output 410. Luminaire 100 in this example embodiment includes multiple solid-state light sources capable of having multiple characteristics controlled via gesture-based commands. Such characteristics may include, for example, power state, intensity or brightness, distribution or spread, focus or aiming, and color of luminaire 100 and/or its individual light sources, just to name a few example characteristics. Such characteristics may be controlled mechanically, electrically, electromechanically, optically, or using any other suitable technique as will be apparent in light of the present disclosure. The lighting system in this example embodiment also includes means for detecting gestures made by user 420, such as a camera, motion detector, depth sensors, or other suitable gesture detecting devices. The lighting system or luminaire 100 may include any additional components needed to detect the gestures, such as the components described herein (e.g., with reference to FIG. 2).

As can be seen in FIG. 4A, user 420 is performing gesture 422 to control the light distribution 412. In some embodiments, gesture 422 may include a natural gesture command for the corresponding result of altering the light distribution 412, such as the user 420 spreading a hand to spread the light distribution in that area or the user 420 spreading/collapsing his or her arms to increase/decrease (respectively) light distribution, for example. As can be seen in FIG. 4B, user 420 is performing gesture 424 to control the light source locations 414. In some embodiments, gesture 424 may include a natural gesture command for the corresponding result of altering the light source locations 414, such as performing an action directly underneath a light source desired to be turned on/off or pointing to a light source to turn on/off, for example. Below is a table of some additional example gesture commands and corresponding results:

| Gesture Command | Command Result |
| --- | --- |
| Hands spreading | Spread light beam |
| Thumbs up in one area | Increase intensity here |
| Quick sideways wave | No light here |
| Pointing to an object or holding it | Light this object |
| Moving across a surface while decreasing finger and thumb spacing | Create a gradient of light across this surface |
| Smoothly moving hand across a surface | Evenly illuminate this surface |

As can be seen in the table above, in some embodiments, the command or control resulting from the gesture performed may be based on at least one of the gesture made and the gesture position. For example, the case of the gesture command of moving across a surface while decreasing finger and thumb spacing to cause the light output to create a gradient of light across the surface includes a command based on both the gesture made and the gesture position. In this example case, the gesture made is decreasing finger and thumb spacing or bringing the thumb and pointer finger of one hand together from an initial spaced out arrangement. The gesture made causes the light output to create a gradient of light. Further, in this example case, the gesture was made while moving the hand across a surface. The movement of the hand across the surface indicated where the gradient of light should be made. In another example case, such as in the case of a hands spreading gesture, a lighting system may perform the command result of spreading the light beam or light output regardless of where the gesture was performed. In such an example case, only the gesture made is used to control the light output. In yet another example case, such as in the case of turning individual light sources on or off in the lighting system, both the gesture and the location may be used to determine the desired result. For example, the user may point to the specific light source desired to be turned on or off, whereby the system would recognize both the gesture used to indicate that the light source is to be turned on or off as well as the location/position of the gesture to indicate which light source is to be turned on or off.

In some embodiments, gesture-based lighting controls may be provided using a computing device 200 that is communicatively coupled to the luminaire(s) 100 being controlled. For example, in the case of a computing device including a touch sensitive display 210, the user may provide gesture-based commands using the display 210. In such cases, the computing device 200 may supplement the gesture-based controls described herein, by allowing the user to perform gestures on the display 210 of the device 200, while moving the device 200 around the room or area where the lighting system is located. However, in such an example case, the user may have to look at the display 210 while controlling the system, thereby obstructing the ability of the user to receive real-time feedback. Therefore, in some embodiments, gestures may be defined in the context of holding a computing device (such as computing device 200 described herein). For example, one or more sensors included in a host computing device may be used to detect the motion of the computing device to determine gestures being performed while holding the device. As previously described, such sensors may include one or more accelerometers 266, gravitational sensors 267, gyroscopic sensors 268, and/or magnetometers or geomagnetic sensors 269.

In some embodiments, the gesture type may be dictated by the control parameter it is associated with. For example, in some cases, the object or parameter of control of the light output may be a continuous space or range (e.g., light intensity, color, distribution, etc.). In some such cases, a mere switch flip or button press or other gesture having two options, for example, may not be sufficient to control a parameter having a continuous space or range. Therefore, in such cases, a related gesture for controlling a parameter having a continuous space or range may have a continuous action or gesture associated with it, such as a lifting or lowering action, for example. Such gestures will be referred to herein as selection gestures. Further, in such cases, it may be desired to be able to apply or remove a selection. Therefore, a related gesture may use two opposing actions to provide the apply/remove input, such as rotating in a clockwise direction and rotating in a counterclockwise direction, for example. Such gestures will be referred to herein as confirmation gestures and may follow selection gestures. Further yet, in such cases, it may be desired to transition between different control parameters or modes for controlling the light output. Therefore, a related gesture may allow for navigation between the different control parameters or modes, such as swiping in the desired direction. Such gestures will be referred to herein as trigger gestures and, in some instances, include binary decision making, such as turning a setting on/off, moving to the next/previous state, etc. A table including some example potential gestures for the three gesture types (selection, confirmation, and trigger) is provided below:

| Gesture | Performed By | Gesture Type | Example of Intent |
|---|---|---|---|
| Pitch (lift/lower) | Raising and lowering hand at the wrist or elbow | Selection | Increase or decrease a continuous parameter |
| Tilt (key lock) | Rotating wrist clockwise or counterclockwise | Confirmation | Apply/remove current selection |
| Fling (left/right) | Swiping hand quickly to the left or right | Trigger | Transition to new state or mode |
| Circle | Tracing shape of a circle with hand | Selection | Select color from a color wheel |
| Toss | Tossing imaginary object away in front or behind | Confirmation | Apply/remove current selection |
| Poke (push/pull) | Quickly moving hand forward or backward, parallel to the ground | Trigger | Apply binary selection |

Figure 6A:
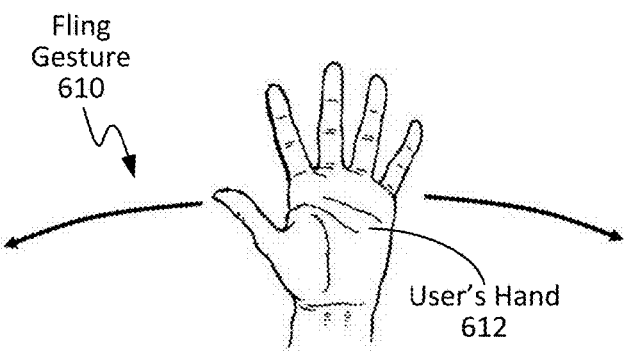
FIG. 6A illustrates an example fling gesture being performed by a user's hand, in accordance with an embodiment of the present disclosure.
Figure 7A:
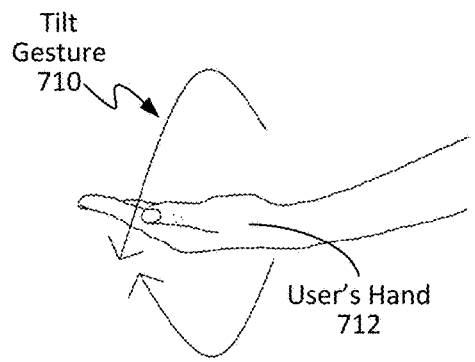
FIG. 7A illustrates an example tilt gesture being performed by a user's hand, in accordance with an embodiment of the present disclosure.

Although there are numerous possible motions that can be performed while holding a computing device, three gestures will be primarily described herein for the selection, confirmation, and trigger gesture types (respectively): a pitch gesture (e.g., 510 in FIG. 5A), a fling gesture (e.g., 610 in FIG. 6A), and a tilt gesture (e.g., 710 shown in FIG. 7A). In some cases, the pitch gesture can be performed by holding the computing device flat (or relatively flat) and lifting or lowering the device in an angular manner by pivoting at the writs or elbow (e.g., such that the end farthest away from the user's wrist is lifted or lowered). In some cases, the fling gesture can be performed by abruptly moving the computing device by translation in a single direction, and the fling gesture may be further classified by the direction of the fling gesture (e.g., fling left, fling right, fling up, fling down, etc.). In some cases, the tilt gesture can be performed by rotating the device about its inertial frame Y-axis (shown in FIG. 3B), which can be achieved by rotating at the wrist or elbow, for example. The example pitch, fling, and tilt gestures are described in more detail below.

Figure 5A:
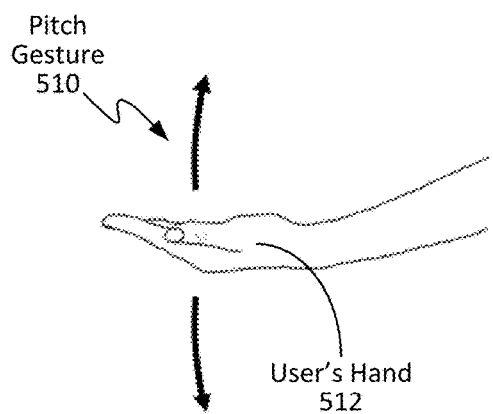
FIG. 5A illustrates an example pitch gesture being performed by a user's hand, in accordance with an embodiment of the present disclosure.

FIG. 5A illustrates an example pitch gesture 510 being performed by a user's hand 512, in accordance with an embodiment of the present disclosure. As previously described, pitch gesture 510 is an example selection gesture and can be performed when computing device 200 is held flat (or relatively flat) and angularly lifted or lowered, by pivoting with the wrist or elbow. The pitch gesture 510, in this example embodiment, includes a natural lifting and lowering motion of the hand 512 as a tunable method of selection. Although computing device 200 is not shown in the user's hand 512 in FIG. 5A, it will be assumed that it is for ease of description herein. In this example embodiment, the pitch gesture 510 can be classified using data from gravitational sensor(s) 267, as described herein. For example, if $$\theta_{pitch} = \arctan\left(\frac{G_y}{G_z}\right)$$

is defined as the pitch angle (e.g., the angle of pitch gesture 510), in which, if the device 200 is held flat before performing the gesture such that the gravitational force is only acting upon the Z-axis of computing device 200, the pitch angle will measure the angle relative to the ground. This can provide an ideal operational range of $$\theta_{pitch}\left(-\frac{\pi}{2}, \frac{\pi}{2}\right).$$

The continuous range of $\theta_{pitch}$ allows for precision within the tunable method of selection, by increasing or decreasing the pitch angle parameter. Note that, in this example, the Z-axis of computing device 200 is illustrated in FIG. 3B.

In some embodiments, pitch gesture 510 and/or the detection thereof may include using corrections or revisions to, for example, ensure the gesture is suitable for the desired purpose. For the pitch gesture 510, in some instances, the computing device 200 is held flat such that the gravitational force is only acting upon the Z-axis of device 200. However, in other instances, the device 200 is not held flat when performing pitch gesture 510, meaning $G_i \neq 0$, for $i \in \{x, y, z\}$. Further, in the case where $G_x \neq 0$, the calculation of $\theta_{pitch}$ will be susceptible to error, as $|G_x|$ increases. To account for this, the pitch angle may instead be defined as $$\theta_{pitch} = \pi/2 - \arccos\left(\frac{G_y}{\sqrt{G_x^2 + G_y^2 + G_z^2}}\right).$$

In such a case, as $G_y \rightarrow 9.81, \theta_{pitch} \rightarrow \pi/2$, and as $G_y \rightarrow -9.81$, $\theta_{pitch} \rightarrow -\pi/2$. Therefore, this second definition of the pitch angle is less susceptible to error than the initial definition. In addition, corrections can be made to account for the starting pitch angle when initiating use of the pitch gesture 510 for the control techniques described herein. Other such corrections can be made, as will be apparent in light of the present disclosure, to ensure that the pitch gesture 510 is a useful and robust mechanism for the techniques described herein.

Figure 5B:
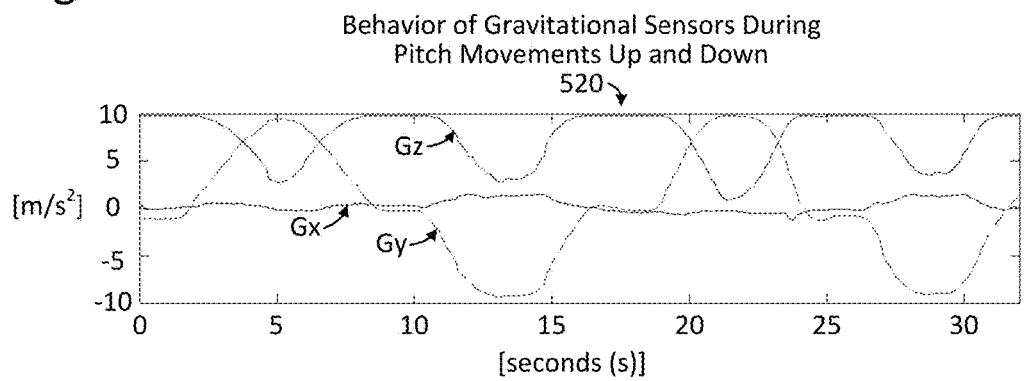
FIGS. 5B-C illustrate example plots relating to the pitch gesture of FIG. 5A.
Figure 5C:
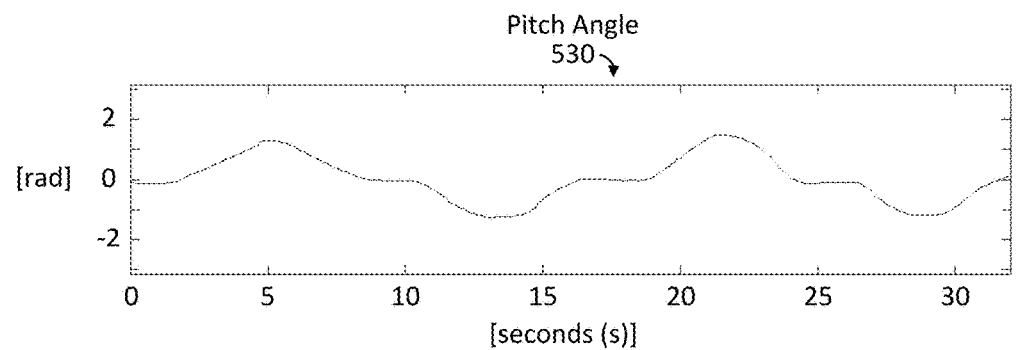

FIGS. 5B-C illustrate example plots relating to the pitch gesture 510 of FIG. 5A. More specifically, in plot 520 of FIG. 5B, the behavior of the gravitational sensors $G_x$, $G_y$, and $G_z$ during pitch movements up and down are plotted as acceleration (m/s²) as a function of time (seconds). In plot 530 of FIG. 5C, the pitch angle resulting from the data in plot 520 is plotted as angle (radians) as a function of time (seconds). As previously described, the continuous range of $\theta_{pitch}$ can be scaled and shifted into any desirable continuous range and can be customized as desired for a give target application or end-use.

FIG. 6A illustrates an example fling gesture 610 being performed by a user's hand 612, in accordance with an embodiment of the present disclosure. As previously described, fling gesture 610 is an example trigger gesture and can be performed by abruptly moving computing device 200 by translation in a single direction. The fling gesture 610, in this example embodiment, includes a quick motion by the user's hand 612 along a particular axis that is measurable with respect to that axis. Although computing device 200 is not shown in the user's hand in FIG. 6A, it will be assumed that it is for ease of description herein. In this example embodiment, the fling gesture 610 can be classified using data from accelerometer(s) 266 (e.g., one or more linear accelerometers), as described herein. Linear accelerometers are typically responsive to quick or sudden motions, making the sensors suitable for detection of fling gesture 610. For example, if $\vec{L} = \langle L_x, L_y, L_z \rangle$ is defined as the linear accelerometer vector, then a fling gesture 610 may be detected when a particular component exceeds a positive and negative threshold in a particular order, as will be explained in more detail below. Further, a quick motion along a particular axis will experience a sudden acceleration and deceleration that is measurable with respect to that axis. Note that fling gesture 610 can be further classified by the direction of movement (e.g., fling left, fling right, fling up, fling down, etc.).

Figure 6B:
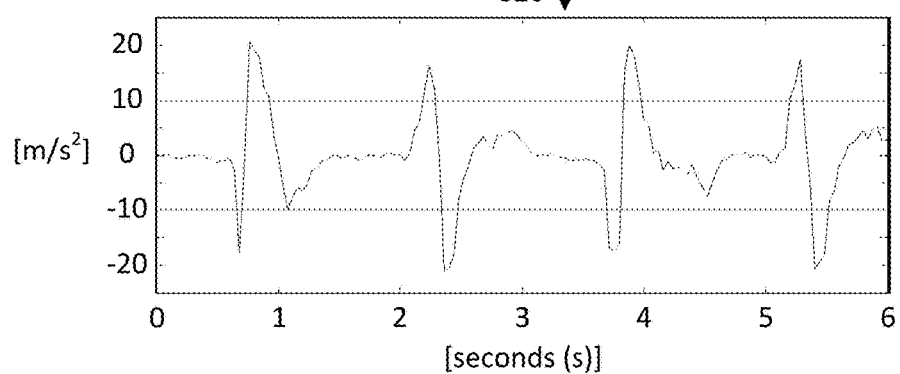
FIGS. 6B-E illustrate example plots relating to the fling gesture of FIG. 6A.

FIGS. 6B-E illustrate example plots relating to the fling gesture 610 of FIG. 6A, each of which will be discussed in turn. FIG. 6B includes plot 620, which shows the behavior of linear accelerometer $L_x$ sensor during left and right fling gestures with a threshold set at ±10 m/s². As can be seen in plot 620, acceleration (m/s²) is plotted as a function of time (seconds). In plot 620, left and right fling gestures were performed successively twice, and the axis of acceleration and deceleration was the X-axis of computing device 200. Note that, in this example, the X-axis of computing device 200 is illustrated in FIG. 3B. Also note that the type of fling gesture 610 can be classified by the active component and the order of threshold exceeding, as illustrated in the table below:

| Fling Type | Active Component | First Threshold | Second Threshold |
|---|---|---|---|
| Left | $L_x$ | Negative | Positive |
| Right | $L_x$ | Positive | Negative |
| Up | $L_z$ | Positive | Negative |
| Down | $L_z$ | Negative | Positive |
| Forward (Poke) | $L_y$ | Positive | Negative |
| Back | $L_y$ | Negative | Positive |

Using the table above and plot 620 in FIG. 6B, it can be seen that the fling gestures 610, going from 0 to 6 seconds in plot 620, are left, right, left, right fling gestures. Recall that in this example case, the threshold was set at ±10 m/s². It can be seen that for the first fling gesture, which is performed approximately from 0.5 to 1.4 seconds, the negative threshold is exceeded and then the positive threshold is exceeded to indicate that a left fling gesture was performed, in this example case. Then, from approximately 2 to 2.7 seconds, it can be seen in plot 620 that the positive threshold is exceeded first before exceeding the negative threshold, thereby indicating that a right fling gesture was performed, in this example case. Past the 3 second mark, it can be seen that the left and right fling gestures are repeated.

In some embodiments, fling gesture 610 and/or the detection thereof may include using corrections or revisions to, for example, ensure the gesture is suitable for the desired purpose. For example, detection of the fling gesture as described with respect to FIG. 6B may include corrections/revisions to address various issues. One such issue that may arise in detection of the fling gesture 610 can be seen in FIG.

Figure 6C:
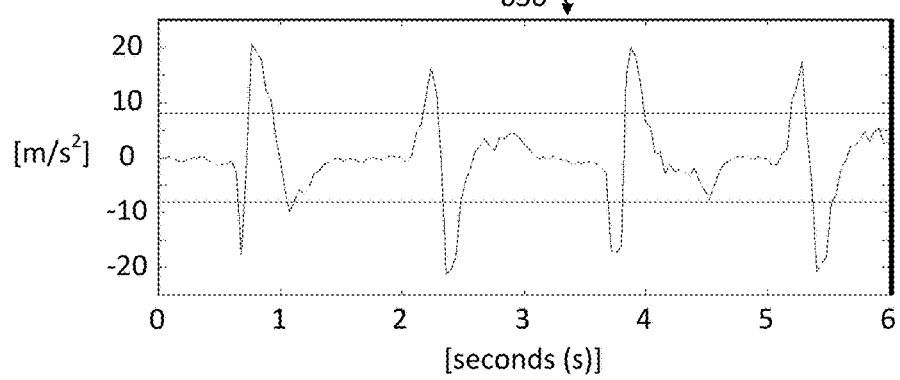
Figure 6D:
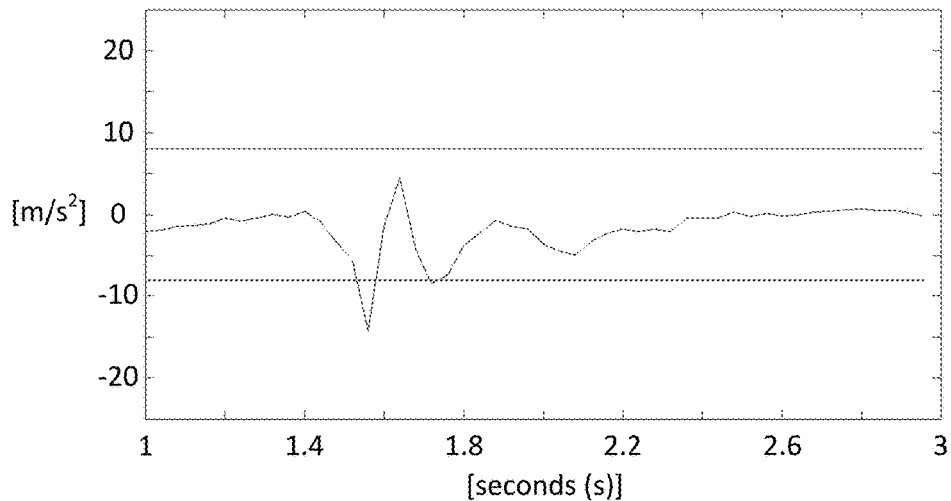

6B where the deceleration of the first fling gesture (the gesture performed around 1 second) ended with stabilizing the user's hand after accelerating to move it. Such stabilizing may, for example, involve overcorrection when moving one's hand to a fixed or default position. This issue can be illustrated using plot 630 in FIG. 6C, where the same fling gesture 610 results from plot 620 of FIG. 6B are shown, but the threshold for detecting the fling gestures was adjusted to ±8 m/s². As can be seen in FIG. 6C, the order of crossing thresholds for the first fling gesture (lasting approximately from 0.5 to 1.4 seconds) goes from negative to positive to negative. By the criterion used for detecting fling gesture 610 in this example embodiment, the threshold crossings would indicate that a fling left immediately followed by a fling right was performed.

Another issue that may occur during the performance of fling gesture 610 and/or the detection thereof relates to whether computing device 200 is rotated during the gesture. In some instances, the device 200 is held flat while performing fling gesture 610, such that no rotation is applied to device 200. However, in other instances, the device is not held flat while performing fling gesture 610, meaning $G_i \neq 0$, for $i \in \{x, y, z\}$. For example, in some such instances, device 200 may be rotated when performing fling gesture 610. Such rotation may cause an unreliability of the sensor component for tracking the fling gesture 610. For example, FIG. 6D includes plot 640, which shows the behavior of linear accelerometer $L_x$ sensor during a right fling gesture, while simultaneously rotating the device 200 about its Y-axis. As can be seen in plot 640, acceleration (m/s²) is plotted as a function of time (seconds), the threshold is set at ±8 m/s², and only the lower/negative threshold is exceeded (twice, during this example fling right gesture). Using the criterion described for this example embodiment, the fling right gesture would not be recognized, because the upper/positive threshold is not exceeded, as seen in plot 640.

As a result of at least the issues described above with respect to fling gesture 610, corrections or revisions can be made to the gesture 610 and/or the detection thereof. One such example correction/revision option was identified using plot 620 of FIG. 6B, where there is a sharp transition from very negative to very positive values, and vice versa, corresponding to the moment in which acceleration ended and deceleration began. As a result, it was determined that the derivative of acceleration, jerk (and the value/sign of the jerk, whether positive or negative), may be used instead of acceleration to ensure a more robust and accurate detection of fling gestures 610. For such an example correction/revision, the jerk function can be defined as $$J(t) = \frac{L(t) - L(t - \delta)}{\delta},$$

as the time-delayed derivative of linear acceleration, where L(t) is the linear acceleration experienced along a particular axis, and δ is the time delay constant. Further, in this example case, a fling gesture can be defined as provided in the following table:

| Fling Type | Active Sensor Component | Jerk Function Exceeds Threshold |
| --- | --- | --- |
| Left | $L_x$ | Negative |
| Right | $L_x$ | Positive |

Figure 6E:
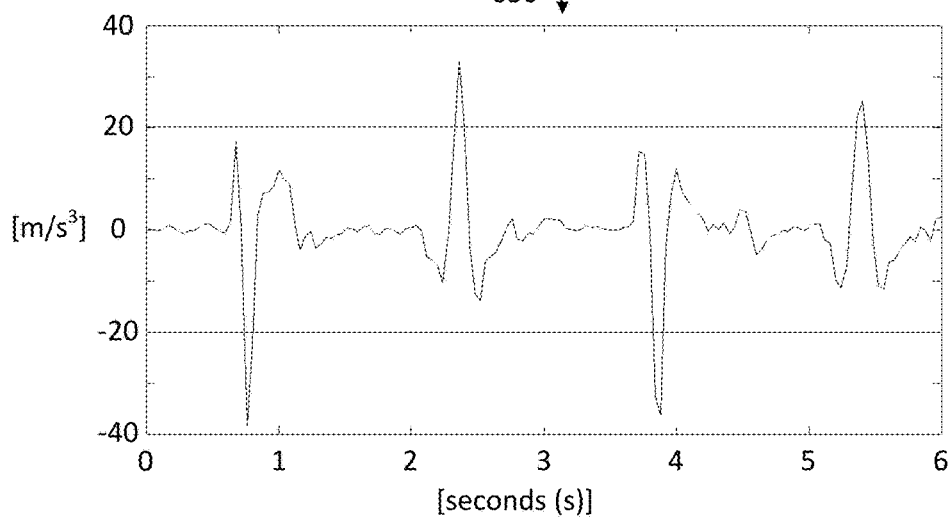

FIG. 6E includes plot 650, which shows the jerk function based off of the data used in plots 620 (which is the same data in plot 630). As can be seen in plot 650, jerk (m/s³) is plotted as a function of time (seconds), and the same fling gestures 610 (left, right, left, right) previously described with respect to plot 620 are shown in plot 650. The plot 650 was created using ±20 m/s³ as the threshold and δ=80 ms as the time constant. The plot 650 helps illustrate a more robust technique for detecting fling gestures 610 by using the jerk function related to the gestures, which may help with eliminating false positive fling detections that can occur due to overcorrection, for example. Further, such a technique helps distinguish binary selections, based upon a specific type of trigger action, as can be understood. As is apparent in light of this disclosure, the threshold can be adjusted based on the computing device 200 used, the target application, or the end-use. Note that although the fling gestures 610 are illustrated and described herein using left and right fling gestures, the techniques are not intended to be so limited. For example, the techniques may be used with fling gestures that occur in upward, downward, forward, and backward directions, or any other suitable direction or set of directions, as will be apparent in light of this disclosure.

FIG. 7A illustrates an example tilt gesture 710 being performed by a user's hand 712, in accordance with an embodiment of the present disclosure. As previously described, tilt gesture 710 is an example confirmation gesture and can be performed by rotating computing device 200 about its inertial frame Y-axis, which can be achieved by a user by rotating at the wrist or elbow, for example. The tilt gesture 710, in this example embodiment, includes a triggering confirmation based off of, for example, the natural movement emulating the locking or unlocking of a key lock. Although computing device 200 is not shown in the user's hand 712 in FIG. 7A, it will be assumed that it is for ease of description herein. In this example embodiment, the tilt gesture 710 can be classified using data from gravitational sensor(s) 267, as described herein. For example, if $$\theta_{tilt} = \arctan2\left(\frac{G_x}{G_z}\right)$$

is defined as the tilt angle (e.g., the angle of tilt gesture 710), the four quadrant inverse tangent function can be used to allow for an operational range for $\theta_{tilt} = (-\pi, \pi)$, where $\theta_{tilt} = 0$ corresponds to the device held flat. Further, $\theta_{tilt}$ approaches π as the device is rotated counterclockwise about the inertial Y-axis of device 200, and $\theta_{tilt}$ approaches −π as the device is rotated clockwise about the inertial Y-axis of device 200. This particular inverse tangent function may help avoid asymptotic discontinuities that would otherwise occur around $\theta_{tilt} = \pm\pi/2$.

Figure 7B:
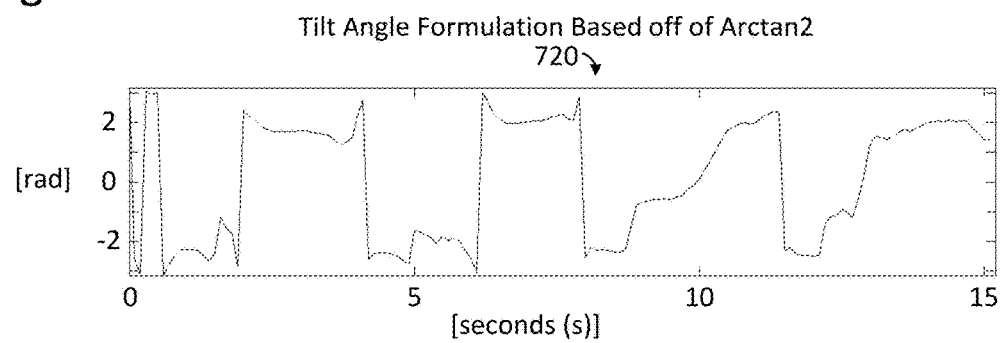
FIGS. 7B-D illustrate example plots relating to the tilt gesture of FIG. 7A.
Figure 7C:
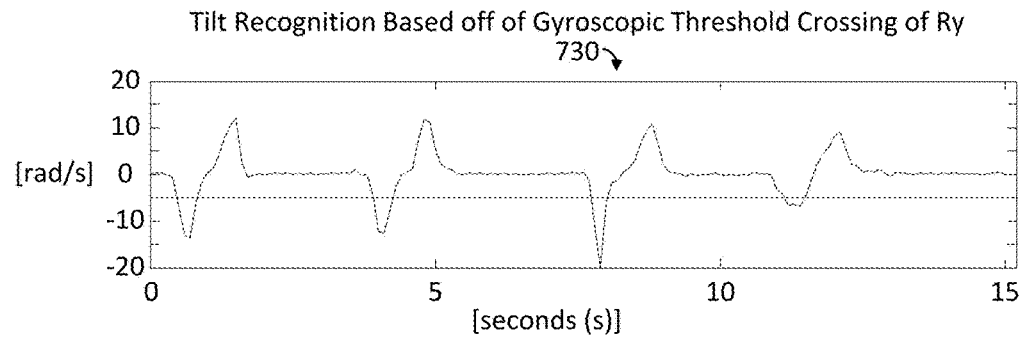

In some embodiments, tilt gesture 710 and/or the detection thereof may include using corrections or revisions to, for example, ensure the gesture is suitable for the desired purpose. For the tilt gesture 710, in instances when the computing device 200 is held flat such that the gravitational force is only acting upon the Z-axis of device 200, $\theta_{tilt}$ provides a continuous range of operational control (as was the case with the pitch gesture 510). As was also the case with pitch gesture 510, in instances where the device 200 is not held flat, when performing the gesture, the calculation of the angle may be susceptible to error, such that when tilt gesture 710 is performed, $\theta_{tilt}$ is susceptible to error. With respect to the pitch gesture 510, the techniques were found to be unreliable as $\theta_{pitch}$ neared ±π/2, and thus appropriate corrections/revisions were described herein to ensure the technique of gesture detection is sufficiently robust. With respect to the tilt gesture 710, the force of gravity is entirely on the Y-axis of device 200, making $G_x$ and $G_z$ no longer reliable for calculating $\theta_{tilt}$. This situation is otherwise known as the Gimbal Lock, where in a three dimension system, one degree of freedom (rotation) is lost, which can lead to discontinuity issues for $\theta_{tilt}$. The discontinuities are illustrated in FIGS. 7B-C, which show a comparison of tilt recognition/formulation, with plot 720 of FIG. 7B being based off of arctan 2 and plot 730 of FIG. 7C being based off of gyroscopic threshold crossing.

Figure 7D:
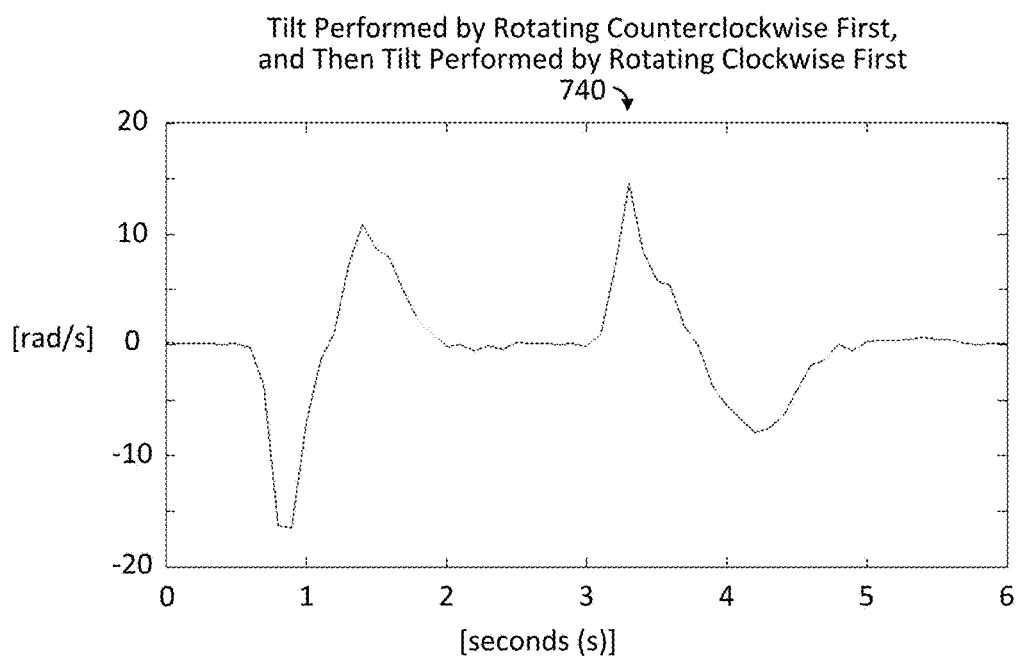

As a result of the discontinuities described above related to techniques using gravitational sensors 267 for detecting tilt gesture 710, techniques using gyroscopic sensors 268 for detecting tilt gesture 710 were explored and found to be suitable for the intended purpose of a confirmation gesture. Recall that the tilt gesture 710, in this example embodiment, includes a triggering confirmation that emulates the locking or unlocking of a key lock. In this locking motion, there is an initial rotation (clockwise or counterclockwise) and corresponding reverse rotation (counterclockwise or clockwise). Regardless of the initial direction of rotation, a tilt gesture 710 can be accurately defined by setting that $R_y$, the rotational speed or angular velocity about the Y-axis of device 200, must exceed a specified threshold. FIG. 7D includes plot 740, which shows rotational speed or angular velocity (radians/s) as a function of time (seconds) for two tilt gestures 710. The first tilt gesture of plot 740 was performed by rotating device 200 counterclockwise first and then rotating device 200 clockwise to return to a flat or default position.

As can be seen in plot 740, the first tilt gesture lasted from approximately 0.5 to 2 seconds and $R_y$ deviates away from the rest position at 0 rad/s, decreases, then increases. The second tilt gesture of plot 740 was performed by rotating device 200 clockwise first and then rotating device 200 counterclockwise to return to a flat or default position. As can be seen in plot 740, the second tilt gesture lasted from approximately 3 to 5 seconds and $R_y$ deviates away from the rest position at 0 rad/s, increases, then decreases. In both cases, $R_y$ deviates away from the rest position at 0 rad/s, such that the threshold for detecting tilt gestures can be set as desired or for a target application or end-use. For example, in FIG. 7D, the threshold could be set at ±5 rad/s, such that when that threshold is exceeded in either direction, the tilt gesture is recognized based on the value (+ or −) of $R_y$. More specifically, in the first tilt gesture 710 of plot 740, it can be seen that $R_y$ exceeded −5 rad/s around approximately 0.7 seconds, thereby indicating that a counterclockwise tilt gesture was performed. Further, when $R_y$ exceeds +5 rad/s around approximately 1.3 seconds, a clockwise tilt may be recognized, but that tilt may be recognized as tilting to return to a flat or default position, depending upon the configuration. Numerous variations and configurations will be apparent in light of this disclosure.

Methodology

Figure 8:
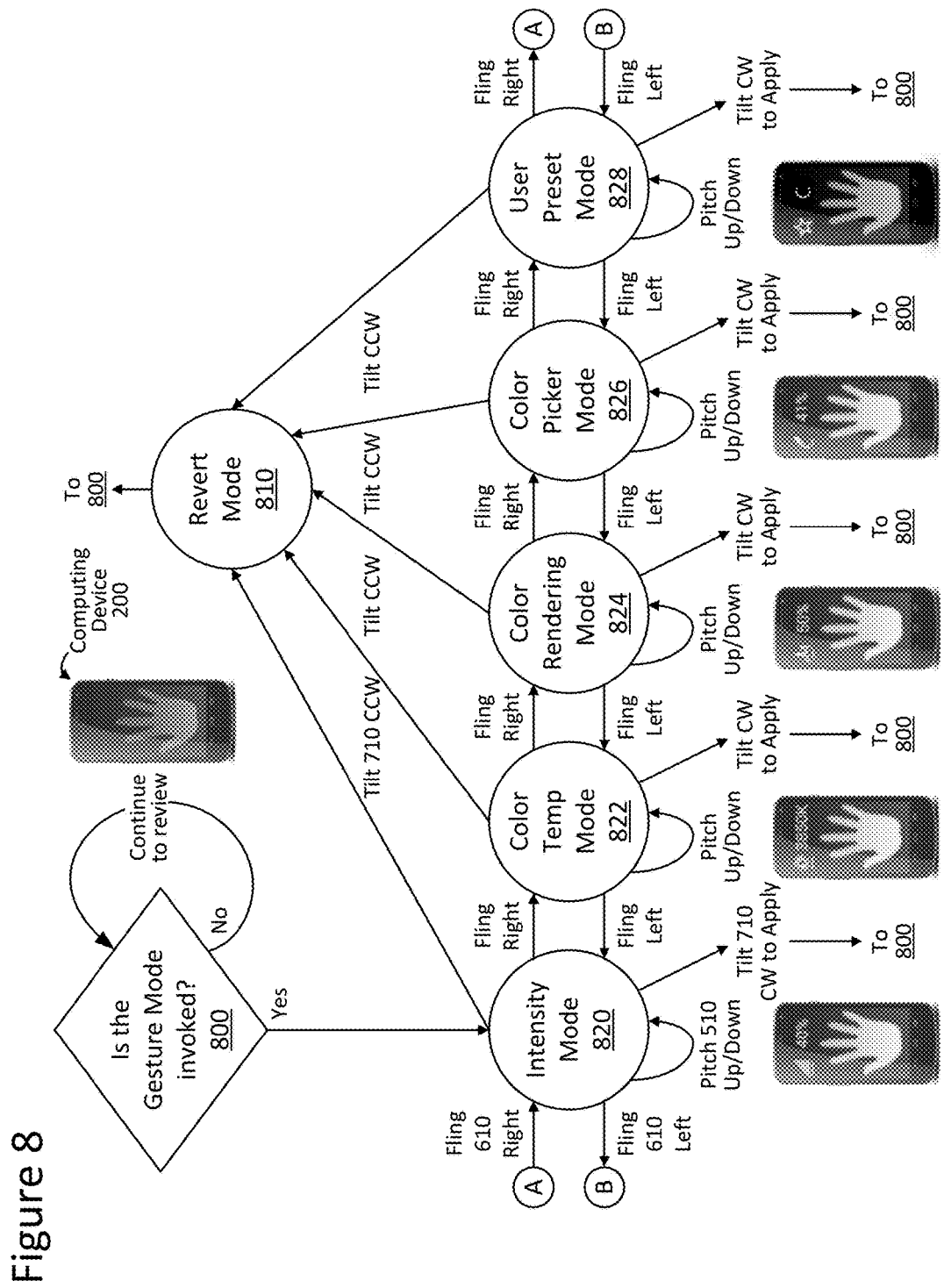
FIG. 8 illustrates an example method for controlling a lighting system, in accordance with an embodiment of the present disclosure.

FIG. 8 illustrates an example method for controlling a lighting system, in accordance with an embodiment of the present disclosure. For ease of description, the method will be described herein using the gesture techniques 510, 610, and 710 (pitch gesture, fling gesture, and tilt gesture, respectively) and computing device 200. However, the method is not intended to be so limited and any other suitable gesture techniques and devices can be used with the method, as will be apparent in light of this disclosure. Note that FIG. 8 also illustrates a gesture-based natural user interface including multiple modes, such as a gesture mode configured to carry out the functionality of the method for controlling the lighting system, as well as numerous modes related to light control, such as an intensity mode, color temperature mode, color rendering mode, color picker mode, and user preset mode, to provide some example modes. The methodology may include techniques for navigating through the gesture mode to, for example, switch between active light control modes (e.g., using a trigger gesture such as a fling gesture 610), adjust the light output attribute that the light control mode controls (e.g., using a selection gesture such as a pitch gesture 510), and apply the selected adjustment to the light output attribute or reverting to the original adjustment/the previously set adjustment (e.g., using a confirmation gesture such as a tilt gesture 710).

The method of FIG. 8 includes determining 800 whether the gesture mode is invoked. The mode may be invoked using any suitable technique, such as by invoking the mode via a computing device program or application, performing a suitable action to invoke the mode (e.g., manually manipulate the computing device in a predetermined manner), or any other suitable technique. In some embodiments, the mode may be invoked by a user by placing a hand over a portion of the display 210 of the computing device 200. In such an embodiment, the user may have to perform an action prior to placing a hand over the display to invoke the gesture mode, such as opening a program or application. Continuing from 800, if the mode is not invoked, the method continues to review until the mode is invoked.

If the gesture mode is invoked at 800, the method can continue by entering one of the light control modes. The light control modes in this example embodiment include: intensity mode 820, which may allow a user to adjust the intensity of the light, such as the dim level of the light; color temperature mode 822, which may allow a user to adjust the color temperature of the light, such as how warm and/or cool the light is; color rendering mode 824, which may allow a user to adjust the color rendering of the light; color picker mode 826, which may allow a user to select the color of the light; and user preset mode 828, which may allow a user to select from one or more light configuration presets (e.g., a preset configured by the user or included with the lighting system). In addition, the following settings can be seen on the device display per mode: intensity is set to 40%, color temperature is set at 3850K, color rendering is set at 50%, color picker is set at 41%, and the user preset is set at C (which may be, for example, a custom user preset that applies all of the other settings). In the example shown in FIG. 8, the initial mode entered is intensity mode 820. However, the method may initially enter any of the light control modes described herein or any other suitable mode, and such mode may be entered by default or as a result of it being the last mode used or changed prior to the gesture mode 800 being exited or no longer invoked, for example. In some embodiments, feedback may be provided (e.g., visual, audial, or tactile) to indicate the gesture mode 800 has been invoked and/or to indicate which light control mode is active. Such feedback may be provided by the computing device 200 or the lighting system 10, for example.

When in one of the light control modes, the user can perform selection, trigger, and confirmation gestures as desired to control the illumination/light provided by the associated lighting system. As can be seen in this example method, the selection gesture includes pitch gesture 510, which can be performed as described herein to adjust the specific light control mode options. Recall that pitch gesture 510 as variously described herein allows for control of a continuous parameter, such that when device 200 is pitched up or down, the light can be configured to adjust according to the active light control mode. When the active light control mode has been adjusted as desired, the user can perform a tilt gesture 710 to apply the selection. In this example method, the user can tilt 710 device 200 in a clockwise (CW) direction (e.g., about its Y-axis) to apply the selection, which emulates locking a key in a key lock (e.g., the selection is locked in). Further, and as can be understood based on the present disclosure, the tilt gesture 710 is a suitable gesture for applying a selection made using the pitch gesture 510, due to the user being able to perform the tilt gesture 710 without affecting the pitch angle $\theta_{pitch}$ due to not having to lift or lower device 200 to perform the tilt gesture 710. If a selection has been applied by tilting 710 in the clockwise direction, then the method can continue by returning to 800. If the user instead desires to revert the active mode to the original selection (e.g., the option selected prior to entering that mode) and not apply the new selection, the user can tilt 710 device 200 in a counterclockwise (CCW) direction (e.g., about its Y-axis) to revert 810 the active mode. After reverting 810 the active mode using a CCW tilt 710, the method may continue to 800 (as shown in FIG. 8) or continue back to the previously active mode, for example.

The method in this example embodiment allows a user to switch between active modes using a fling gesture 610 (fling left or fling right, in this example case). For example, as can be seen in FIG. 8, if the user is in the intensity mode 820 and performs a fling 610 right gesture, then the color temperature mode 822 would be entered and become active, allowing the user to adjust that mode using a pitch 510 gesture. As can be seen, if the user flings 610 through all of the light control modes, the method is configured in this example to continue back to the first light control mode. For example, if the user performs a fling 610 right gesture when in the user preset mode 828, the intensity mode 820 will be entered (indicated by the A link). Further, if the user performs a fling 610 left gesture when in the intensity mode 820, the user preset mode 828 will be entered (indicated by the B link). Note that the order of the available light control modes may be preset or user-configurable. In some instances, the active mode may also be reverted to the original selection (e.g., the option selected prior to entering that mode) if the active mode is switched prior to applying the new selection (e.g., prior to tilting 710 clockwise to apply the selection made using the pitch gesture 510). As previously described and as can be understood by the method of FIG. 8, the selection, trigger, and confirmation gestures (pitch 510, fling 610, and tilt 710 gestures, in this example case) can be performed while looking at the light or the lighting system to receive real-time feedback.

Numerous variations on the methodology of FIG. 8 will be apparent in light of this disclosure. In some embodiments, the method and/or the modes may be implemented by, for example, one or more controllers and/or processors. For example, in some embodiments, the method may be implemented by controller 220 and/or processor 230 of computing device 200 (e.g., as shown in FIG. 3A and described herein). In some embodiments, the method may additionally or alternatively be implemented by controller 120 and/or processor 130 of one or more luminaires 100 of system 10 (e.g., as shown in FIGS. 1 and 2 and described herein). In other words, the intelligence for performing the methods and techniques variously described herein may be located in or operatively coupled to a computing device 200 and/or a luminaire(s) 100, for example. As will be appreciated, and in accordance with some embodiments, one or more aspects of the method shown in FIG. 8 and described herein can be implemented, for example, as a module or sub-module that, when executed by one or more controllers and/or processors or otherwise operated, causes the associated functionality as described herein to be carried out.

The modules/sub-modules may be implemented, for instance, in software (e.g., executable instructions stored on one or more computer readable media), firmware (e.g., embedded routines of a microcontroller or other device which may have I/O capacity for soliciting input from a user and providing responses to user requests), and/or hardware (e.g., gate level logic, field-programmable gate array, purpose-built silicon, etc.). In some embodiments, a non-transitory computer program product comprising a plurality of instructions non-transiently encoded thereon that, when executed by one or more processors, cause a process to be carried out, the process can include the functionality of the methodology and techniques variously described herein. The computer program product may include one or more computer-readable mediums, such as, for example, a hard drive, compact disk, memory stick, server, cache memory, register memory, random-access memory (RAM), read-only memory (ROM), flash memory, or any suitable non-transitory memory that is encoded with instructions that can be executed by one or more processors, or a plurality or combination of such memories.

Numerous embodiments will be apparent in light of this disclosure. One example embodiment provides a computing device including: a processor configured to determine a gesture made by the computing device, the gesture determination based on motion of the computing device; and a communication module configured to transmit a control signal to a luminaire including at least one solid-state light source configured to output light, wherein the control signal is based on the gesture determined by the processor and is capable of controlling the light output. In some cases, the gesture determination is based on input from at least one of: a gravitational sensor operatively coupled to the computing device and configured to measure gravitational forces acting upon the computing device; an accelerometer operatively coupled to the computing device and configured to measure acceleration of the computing device; and a gyroscopic sensor operatively coupled to the computing device and configured to measure rotation of the computing device. In some cases, the gesture is a pitch gesture performed by angularly lifting and lowering the computing device to provide a continuous range of pitch angles and the control signal is based on the pitch angle. In some such cases, the pitch angle is determined using at least a gravitational sensor operatively coupled to the computing device and configured to measure gravitational forces acting upon the computing device. In some such cases where the gesture is a pitch gesture, the processor is configured to perform at least one correction when determining the pitch angle to increase the accuracy of the pitch gesture. In some cases, the device includes a user interface including at least two light control modes, each mode configured to adjust a unique attribute of the light output in response to user input. In some such cases, only a single mode can be active for controlling the light output at a given time and a fling gesture performed by moving the computing device by translation in a direction can be used to switch the active mode based on the fling direction. In some such cases, the fling direction is determined using at least an accelerometer operatively coupled to the computing device and configured to measure acceleration of the computing device. In some such cases where the fling gesture can be used to switch the active mode, the processor is configured to perform at least one correction when determining the fling direction to increase the accuracy of the fling gesture. In some such cases where the device includes a user interface, the unique attribute of the light output has at least two selectable options and a tilt gesture performed by rotating the device in a direction about a main axis of the device can be used to cause at least one of applying the selected option and reverting to the previously selected option based on the tilt direction. In some such cases, the tilt direction is determined using at least a gyroscopic sensor operatively coupled to the computing device and configured to measure rotation of the computing device. In some such cases where the tilt gesture can be used to cause at least one of applying the selected option and reverting to the previously selected option, the processor is configured to perform at least one correction when determining the tilt direction to increase the accuracy of the tilt gesture. In some cases, the control signal is capable of controlling at least one of light intensity and light color. In some cases, a lighting system including the computing device is provided, the system including the luminaire.

Another example embodiment provides a method of controlling light output from a luminaire, the luminaire including at least one solid-state light source configured to output the light, the method including: receiving a control signal based on a gesture performed by moving a computing device, the luminaire communicatively coupled to the computing device via a wireless communication link; and adjusting the light output based on the control signal. In some cases, adjusting the light output includes at least one adjusting the light intensity and light color.

Another example embodiment provides a non-transitory computer program product comprising a plurality of instructions non-transiently encoded thereon that, when executed by one or more processors, cause a process to be carried out. The computer program product may include one or more computer-readable mediums, such as, for example, a hard drive, compact disk, memory stick, server, cache memory, register memory, random-access memory (RAM), read-only memory (ROM), flash memory, or any suitable non-transitory memory that is encoded with instructions that can be executed by one or more processors, or a plurality or combination of such memories. The process includes: in response to user input, invoke a gesture mode configured to allow a user to control light output from a luminaire including at least one solid-state light source configured to output the light, wherein the gesture mode includes one or more light control modes, each light control mode capable of adjusting a unique attribute of the light output; and navigate the gesture mode based on gestures made by moving a computing device operatively coupled to the one or more processors. In some cases, a pitch gesture performed by angularly lifting and lowering the computing device to provide a continuous range of pitch angles can be used to adjust the light output based on the pitch angle. In some cases, a fling gesture performed by moving the computing device by translation in a direction can be used to switch between the light control modes based on the fling direction. In some cases, the unique attribute of the light output has at least two selectable options and a tilt gesture performed by rotating the device in a direction about a main axis of the device can be used to cause at least one of applying the selected option and reverting to the previously selected option based on the tilt direction.

Another example embodiment provides a lighting system including: at least one image sensor having a field of view; a processor configured to determine a gesture made within the field of view; and a controller configured to generate a control signal based on the gesture made, wherein the control signal is for controlling light output. In some cases, the controller is further configured to generate the control signal based on the location of the gesture within the field of view.

The foregoing description of example embodiments has been presented for the purposes of illustration and description. It is not intended to be exhaustive or to limit the present disclosure to the precise forms disclosed. Many modifications and variations are possible in light of this disclosure. It is intended that the scope of the present disclosure be limited not by this detailed description, but rather by the claims appended hereto. Future-filed applications claiming priority to this application may claim the disclosed subject matter in a different manner and generally may include any set of one or more limitations as variously disclosed or otherwise demonstrated herein.

What is claimed is:

1. A computing device comprising:
  a processor configured to:
    determine a gesture made by the computing device, the gesture determination based on motion of the computing device;
    navigate a user interface displayed on the computing device when the gesture is along a first axis of the computing device, wherein the gesture along the first axis is a fling gesture performed by moving the computing device by translation along the first axis and used to switch the active mode based on the fling direction;
    adjust a light output of a luminaire when the gesture is along a second axis of the computing device, wherein:
      the luminaire includes at least one solid-state light source configured to output light;
      the gesture along the second axis is a pitch gesture performed by angularly lifting and lowering the computing device to provide a continuous range of pitch angles;
      the control signal is based on the pitch angle; and
      the pitch angle is dependent upon gravitational forces acting on the computing device along the first axis, the second axis, and a third axis of the computing device;
    perform at least one error correction when determining the pitch angle to increase the accuracy of the pitch gesture when the computing device is not held flat when performing the pitch gesture, wherein the error originates from non-zero gravitational forces along the first axis and the third axis when the computing device is not held flat; and
    confirm or revert the adjustment of the light output of the luminaire when the gesture is around the third axis of the computing device, wherein the gesture around the third axis is a tilt gesture performed by rotating the device in a direction about the third axis to confirm the selected option or revert to the previously selected option based on the tilt direction around the third axis; and
  a communication module configured to transmit a control signal to the luminaire, wherein the control signal adjusts the light output of the luminaire based on the gesture along the second axis of the computing device.

2. The device of claim 1, wherein the gesture determination is based on input from at least one of:

a gravitational sensor operatively coupled to the computing device and configured to measure gravitational forces acting upon the computing device;

an accelerometer operatively coupled to the computing device and configured to measure acceleration of the computing device; and a gyroscopic sensor operatively coupled to the computing device and configured to measure rotation of the computing device.

3. The device of claim 1, wherein the pitch angle is determined using at least a gravitational sensor operatively coupled to the computing device and configured to measure the gravitational forces acting upon the computing device.

4. The device of claim 1, wherein the user interface includes at least two light control modes, each mode configured to adjust a unique attribute of the light output in response to user input.

5. The device of claim 4, wherein only a single mode can be active for controlling the light output at a given time.

6. The device of claim 5, wherein the fling direction is determined using at least an accelerometer operatively coupled to the computing device and configured to measure acceleration of the computing device.

7. The device of claim 5, wherein the processor is configured to perform at least one correction when determining the fling direction to increase the accuracy of the fling gesture.

8. The device of claim 4, wherein the unique attribute of the light output has at least two selectable options.

9. The device of claim 8, wherein the tilt direction is determined using at least a gyroscopic sensor operatively coupled to the computing device and configured to measure rotation of the computing device.

10. The device of claim 8, wherein the processor is configured to perform at least one correction when determining the tilt direction to increase the accuracy of the tilt gesture.

11. The device of claim 1, wherein the control signal is capable of controlling at least one of light intensity and light color.

12. A lighting system comprising the computing device of claim 1 and the luminaire.

13. A method of controlling light output from a luminaire, the luminaire including at least one solid-state light source configured to output the light, the method comprising:

determining a gesture made by a computing device, the gesture determination based on motion of the computing device;

navigating a user interface displayed on the computing device when the gesture is along a first axis of the computing device, wherein the gesture along the first axis is a fling gesture performed by moving the computing device by translation along the first axis and used to switch the active mode based on the fling direction;

transmitting a control signal to the luminaire, wherein:
the control signal adjusts the light output of the luminaire based on the gesture when the gesture is along a second axis of the computing device;
the gesture along the second axis is a pitch gesture performed by angularly lifting and lowering the computing device to provide a continuous range of pitch angles;
the control signal is based on the pitch angle; and
the pitch angle is dependent upon gravitational forces acting on the computing device along the first axis, the second axis, and a third axis of the computing device;

performing at least one error correction when determining the pitch angle to increase the accuracy of the pitch gesture when the computing device is not held flat when performing the pitch gesture, wherein the error originates from non-zero gravitational forces along the first axis and the third axis when the computing device is not held flat; and confirming or reverting the adjustment of the light output of the luminaire when the gesture is around the third axis of the computing device, wherein the gesture around the third axis is a tilt gesture performed by rotating the device in a direction about the third axis to confirm the selected option or revert to the previously selected option based on the tilt direction around the third axis.

14. The method of claim 13, wherein the control signal adjusts at least one of the light intensity and light color of the at least one solid-state light source.

15. A non-transitory computer program product encoded with instructions that, when executed by one or more processors operatively coupled to a computing device, causes a process to be carried out, the process comprising:

in response to user input, invoking a gesture mode configured to allow a user to control light output from a luminaire including at least one solid-state light source configured to output the light, wherein the gesture mode includes one or more light control modes, each light control mode capable of adjusting a unique attribute of the light output;

navigating between the one or more light control modes when a gesture is detected that moves the computing device along a first axis of the computing device, wherein the gesture along the first axis is a fling gesture performed by moving the computing device by translation along the first axis and used to switch the active mode based on the fling direction;

transmitting a control signal to the luminaire, wherein:
the control signal adjusts the light output of the luminaire when a gesture is detected that moves the computing device along a second axis of the computing device;
the gesture along the second axis is a pitch gesture performed by angularly lifting and lowering the computing device to provide a continuous range of pitch angles;
the control signal is based on the pitch angle; and
the pitch angle is dependent upon gravitational forces acting on the computing device along the first axis, the second axis, and a third axis of the computing device;

performing at least one correction when determining the pitch angle to increase the accuracy of the pitch gesture when the computing device is not held flat when performing the pitch gesture, wherein the error originates from non-zero gravitational forces along the first axis and the third axis when the computing device is not held flat; and confirming or reverting the adjustment of the light output of the luminaire when a gesture is detected that moves the computing device around the third axis of the computing device, wherein the gesture around the third axis is a tilt gesture performed by rotating the device in a direction about the third axis to confirm the selected option or revert to the previously selected option based on the tilt direction around the third axis.

16. The computer program product of claim 15, wherein the unique attribute of the light output has at least two selectable options.

\* \* \* \* \*